US012527258B2

(12) United States Patent
Edo et al.

(10) Patent No.: US 12,527,258 B2
(45) Date of Patent: Jan. 20, 2026

(54) AGRICULTURAL ROBOT

(71) Applicant: KUBOTA CORPORATION, Osaka (JP)

(72) Inventors: Shunsuke Edo, Sakai (JP); Takuya Tamai, Sakai (JP); Jumpei Miyamoto, Sakai (JP); Tomoyoshi Sakano, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 545 days.

(21) Appl. No.: 17/990,825

(22) Filed: Nov. 21, 2022

(65) Prior Publication Data

US 2023/0078003 A1    Mar. 16, 2023

Related U.S. Application Data

(63) Continuation of application No. PCT/JP2021/022292, filed on Jun. 11, 2021.

(30) Foreign Application Priority Data

Jun. 24, 2020  (JP) .................. 2020-109080
Jun. 24, 2020  (JP) .................. 2020-109081

(51) Int. Cl.
*A01D 46/30* (2006.01)
*G01N 33/00* (2006.01)
(Continued)

(52) U.S. Cl.
CPC ......... *A01D 46/30* (2013.01); *G01N 33/0098* (2013.01); *G06V 10/255* (2022.01); *G06V 20/68* (2022.01)

(58) Field of Classification Search
CPC .................... A01D 46/30; G01N 33/0098
See application file for complete search history.

(56) References Cited

U.S. PATENT DOCUMENTS 4,532,757 A * 8/1985 Tutle ................ A01D 46/24
                                              382/110
4,843,561 A * 6/1989 Larson ................. B25J 9/04
                                              701/50
(Continued)

FOREIGN PATENT DOCUMENTS

JP    2011-229406 A   11/2011
KR   20140038175 A    3/2014
(Continued)

OTHER PUBLICATIONS

Official Communication issued in International Patent Application No. PCT/JP2021/022292, mailed on Aug. 17, 2021.
(Continued)

*Primary Examiner* — Claude J Brown
(74) *Attorney, Agent, or Firm* — Keating & Bennett, LLP

(57) ABSTRACT

An agricultural robot includes a traveling body, a working unit on the traveling body to do work relating to a crop, an optical sensor on the traveling body, and a crop estimator to perform estimation of the crop based on sensor data obtained by the optical sensor. The crop estimator includes a data extractor to designate the crop to be subjected to the estimation based on the sensor data and extract, as partial data, a portion of the sensor data that corresponds to the designated crop, and an estimator to perform the estimation of the crop based on a surface condition of the crop obtained from the partial data extracted by the data extractor.

14 Claims, 33 Drawing Sheets

(51) Int. Cl.
*G06V 10/20* (2022.01)
*G06V 20/68* (2022.01)

(56) References Cited

U.S. PATENT DOCUMENTS

| | | | | |
|---|---|---|---|---|
| 4,873,644 A * | 10/1989 | Fujii | ................ | B25J 9/1697 |
| | | | | 700/219 |
| 5,471,827 A * | 12/1995 | Janssen | ................ | A01G 18/70 |
| | | | | 56/13.1 |
| 6,721,444 B1 | 4/2004 | Gu et al. | | |
| 7,215,420 B2 * | 5/2007 | Gellerman | ............ | G01N 21/65 |
| | | | | 356/301 |
| 7,882,686 B2 * | 2/2011 | Bryan, Jr. | ............ | A01D 46/243 |
| | | | | 56/13.1 |
| 8,666,552 B2 * | 3/2014 | Zeelen | ................ | A01D 46/30 |
| | | | | 901/47 |
| 9,226,446 B2 * | 1/2016 | Moore | ................ | A01D 46/30 |
| 9,462,749 B1 * | 10/2016 | Jens | ...................... | G06T 7/0004 |
| 9,898,688 B2 * | 2/2018 | Bleiweiss | ............ | G06T 7/0004 |
| 9,928,584 B2 * | 3/2018 | Jens | ........................ | G06T 7/001 |
| 10,555,460 B2 * | 2/2020 | Bhavani | ................ | A01D 46/24 |
| 2003/0149544 A1 * | 8/2003 | Brown | ................ | B07C 5/3422 |
| | | | | 702/81 |
| 2016/0309650 A1 | 10/2016 | Jens et al. | | |
| 2017/0032258 A1 * | 2/2017 | Miresmailli | ............ | G06N 5/04 |
| 2021/0076570 A1 | 3/2021 | Hishiki et al. | | |

FOREIGN PATENT DOCUMENTS

| | | |
|---|---|---|
| WO | 00/57129 A1 | 9/2000 |
| WO | 2010063075 A1 | 6/2010 |
| WO | 2018/211621 A1 | 11/2018 |

OTHER PUBLICATIONS

Zheng et al., "Real-Time Vegetables Recognition System based on Deep Learning Network for Agricultural Robots", 2018 Chinese Automation Congress (CAC), Nov. 30, 2018, 8 pages.
Sato et al., "Fruit detection using machine learning in watermelon harvesting", Preprints of the 38th academic lecture conference of the Society of Instrument and Control Engineers Kyushu Branch, Nov. 30, 2019, 7 pages.
Sa et al., "DeepFruits: A Fruit Detection System Using Deep Neural Networks", Sensors, vol. 16, No. 8, 1222, Aug. 3, 2016, 24 pages.
Official Communication issued in corresponding European Patent Application No. 21829595.4, mailed on Aug. 22, 2024, 8 pages.

* cited by examiner

Fig.13

| Data of shape on surface | Type of crop | Model |
|---|---|---|
| Shape 001 | Watermelon | Surface condition model |
| Shape 002 | Watermelon | |
| Shape 003 | Pumpkin | |
| Shape 004 | Watermelon | |
| Shape 005 | Pumpkin | |
| Shape 006 | Melon | |
| Shape 007 | Watermelon | |
| Shape 008 | Pumpkin | |
| Shape 009 | Melon | |
| Shape 010 | Watermelon | |
| Shape 011 | Melon | |
| Shape 012 | Watermelon | |
| Shape 013 | Pumpkin | |
| Shape 014 | Pumpkin | |
| Shape 015 | Melon | |
| . . . | . . . | | ns
AGRICULTURAL ROBOT

CROSS REFERENCE TO RELATED APPLICATIONS

This application is a continuation application of International Application No. PCT/JP2021/022292, filed on Jun. 11, 2021, which claims the benefit of priority to Japanese Patent Application No. 2020-109080, filed on Jun. 24, 2020, and to Japanese Patent Application No. 2020-109081, filed on Jun. 24, 2020. The entire contents of each of these applications are hereby incorporated herein by reference.

BACKGROUND OF THE INVENTION

1. Field of the Invention

The present invention relates to an agricultural robot.

2. Description of the Related Art

An agricultural robot disclosed in Japanese Unexamined Patent Application Publication No. 2011-229406 is known.

The agricultural robot disclosed in Japanese Unexamined Patent Application Publication No. 2011-229406 includes a traveling body provided with a manipulator capable of harvesting crops.

SUMMARY OF THE INVENTION

Crops such as watermelon, melon, and pumpkin are generally planted and grown at various areas. It is necessary to appropriately obtain information about crops when doing work using an agricultural robot, but in reality, it is difficult to appropriately obtain information about crops for various reasons.

Preferred embodiments of the present invention provide agricultural robots each capable of easily estimating a crop from sensor data.

Preferred embodiments of the present invention also provide agricultural robots each making it possible to easily know the posture of a crop.

An agricultural robot according to a first aspect of a preferred embodiment of the present invention includes a traveling body, a working unit on the traveling body to do work relating to a crop, an optical sensor on the traveling body, and a crop estimator to perform estimation of the crop based on sensor data obtained by the optical sensor, and the crop estimator includes a data extractor to designate the crop to be subjected to the estimation based on the sensor data and extract, as partial data, a portion of the sensor data that corresponds to the designated crop, and an estimator to perform the estimation of the crop based on a surface condition of the crop obtained from the partial data extracted by the data extractor.

The estimator may be operable to, with respect to the crop represented in the partial data, perform the estimation of the crop based on a type of the crop and the surface condition of the crop.

The estimator may be operable to perform the estimation of the crop based on the type of the crop and a pattern on the crop as the surface condition of the crop.

The estimator may be operable to calculate, based on a result of the estimation of the crop, an outline of the crop included in the partial data.

The estimator may be operable to perform estimation of a type of the crop and, with respect to a surrounding area of the crop obtained in the partial data, estimate an obstacle which hides a surface of the crop having been subjected to the estimation.

The working unit may be operable to do work to move the obstacle estimated by the estimator away from the crop.

The agricultural robot may further include a model generator to generate a surface condition model by subjecting a relationship between the crop and the surface condition of the crop to deep learning.

An agricultural robot according to a second aspect of a preferred embodiment of the present invention includes a traveling body, a working unit on the traveling body to do work relating to a crop, an optical sensor on the traveling body, and a crop estimator to perform estimation of the crop based on sensor data obtained by the optical sensor, and the crop estimator is operable to perform estimation of a posture of the crop based on a surface condition of the crop obtained from the sensor data.

The crop estimator may be operable to, with respect to the crop represented in the sensor data, perform the estimation of the posture of the crop based on one or more features of the crop and the surface condition of the crop.

The crop estimator may be operable to perform the estimation of the posture based on an orientation of a pattern on a surface of the crop represented in the sensor data.

The crop estimator may be operable to perform the estimation of the posture based on a length of a pattern on a surface of the crop represented in the sensor data.

The crop estimator may be operable to perform the estimation of the posture based on a positional relationship between one or more features of the crop and a pattern.

The crop estimator may be operable to, based on the sensor data, perform estimation of an outline of the crop and, with respect to a surrounding area of the crop, estimate an obstacle which hides a surface of the crop having been subjected to the estimation.

The working unit may be operable to do work to move the obstacle estimated by the crop estimator away from the crop.

The agricultural robot may further include a model generator to generate a surface condition model by subjecting a relationship between the crop and the surface condition of the crop to deep learning.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 13 shows a relationship between a surface condition model and data according to the first preferred embodiment of the present invention.

DETAILED DESCRIPTION OF THE PREFERRED EMBODIMENTS

Figure 1:
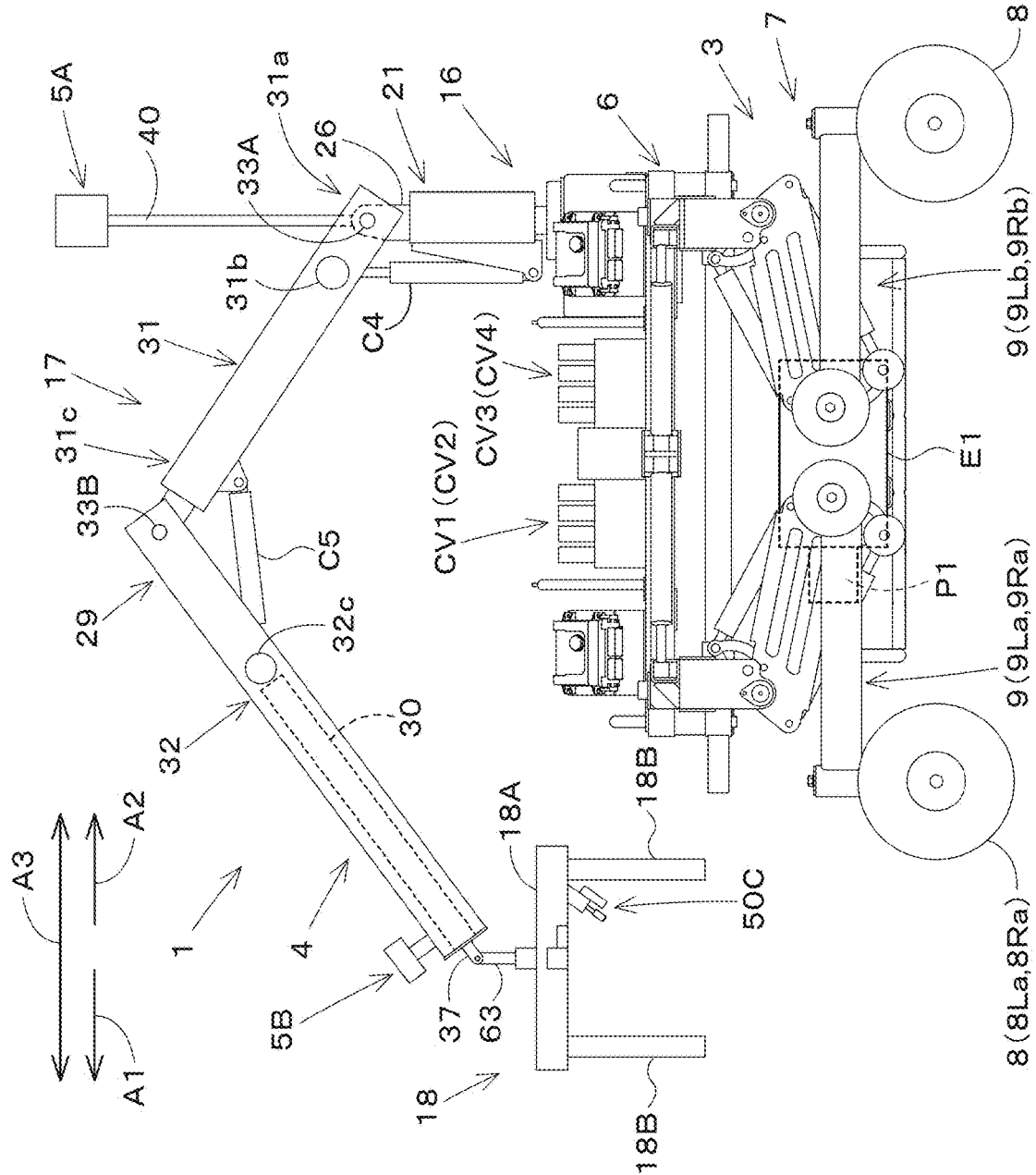
FIG. 1 is a side view of an agricultural robot according to a first preferred embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses preferred embodiments of the present invention with reference to drawings as appropriate.

First Preferred Embodiment

Figure 2:
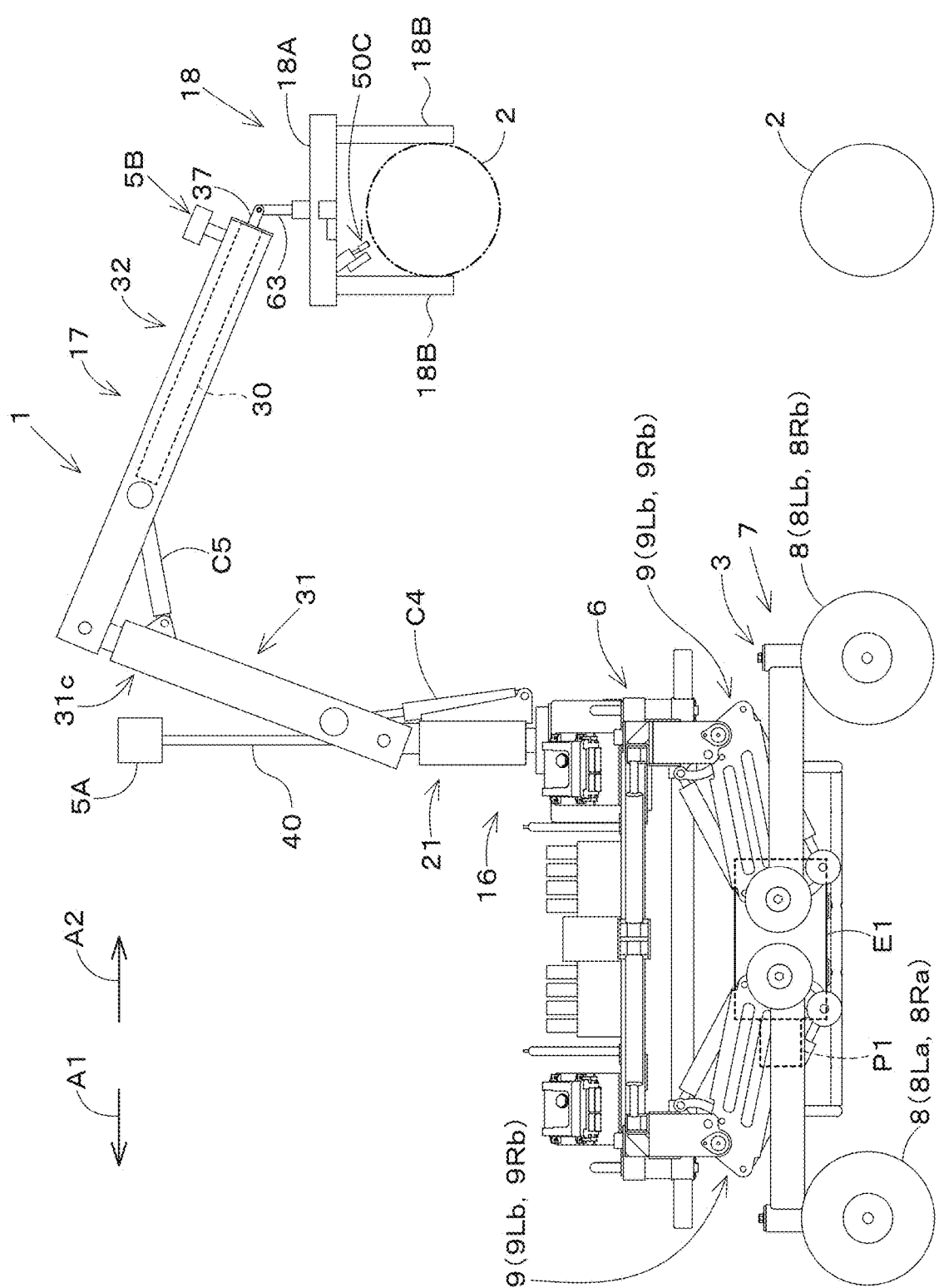
FIG. 2 is a side view of the agricultural robot in a working posture according to the first preferred embodiment of the present invention.

FIGS. 1 and 2 illustrate an example of an agricultural robot 1. The agricultural robot 1 does work (agricultural work) relating to crop(s) 2 grown (cultivated) in a facility such as a facility for protected horticulture (e.g., a house) or a plant factory as illustrated in FIGS. 16 to 19. The agricultural robot 1 does work relating to, for example, heavy vegetables, fruits, and/or the like which are relatively heavy crops 2 such as watermelon, melon, and/or pumpkin.

First, the following description discuses a facility with the use of, as an example, a facility for protected horticulture (protected horticulture facility).

As illustrated in FIGS. 16 to 19, a facility 100 includes, as structures thereof, a house 101 and equipment 102 located inside the house 101.

Figure 16:
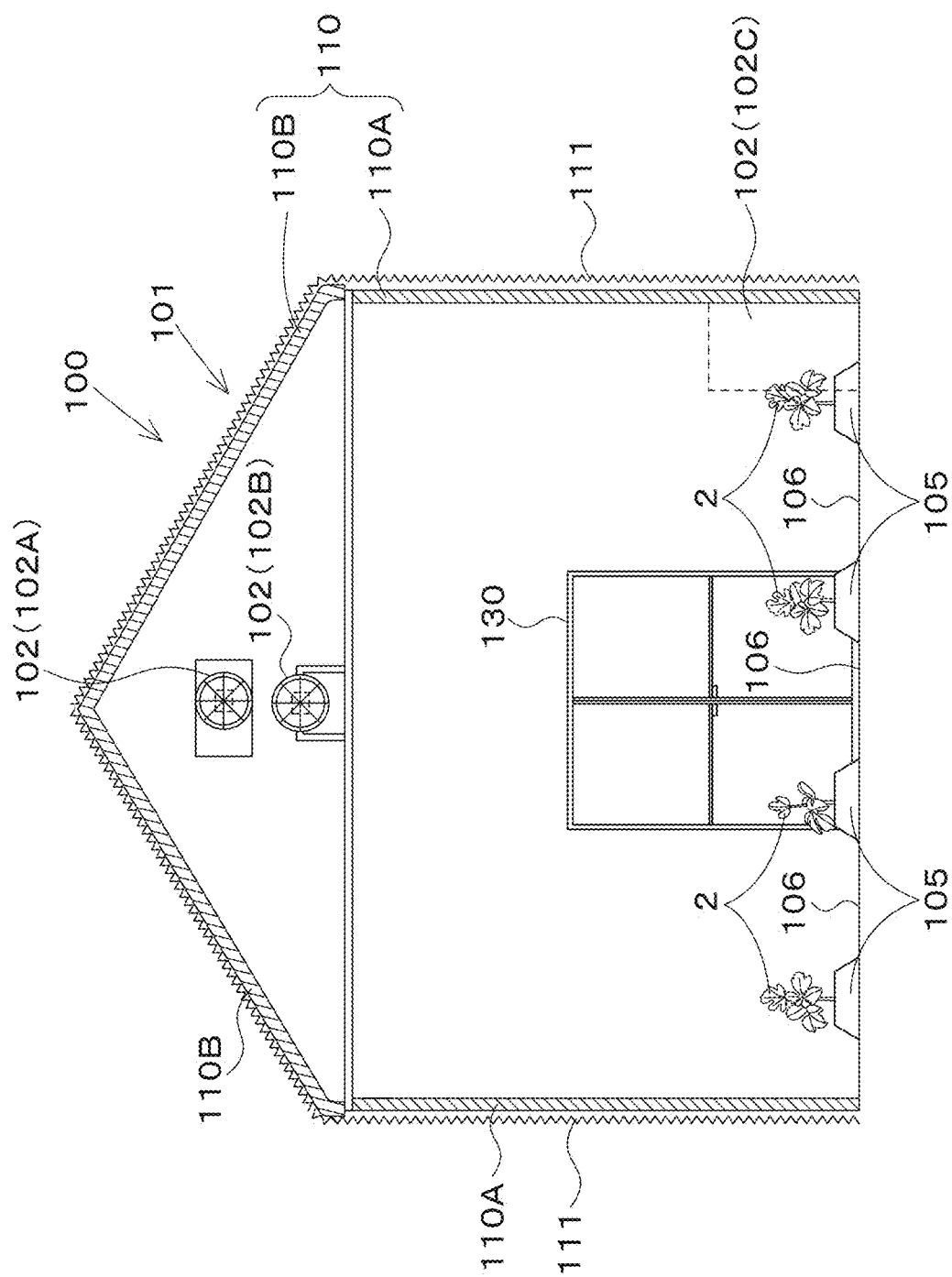
FIG. 16 schematically illustrates the interior of a facility for protected horticulture according to the first preferred embodiment of the present invention.
Figure 17:
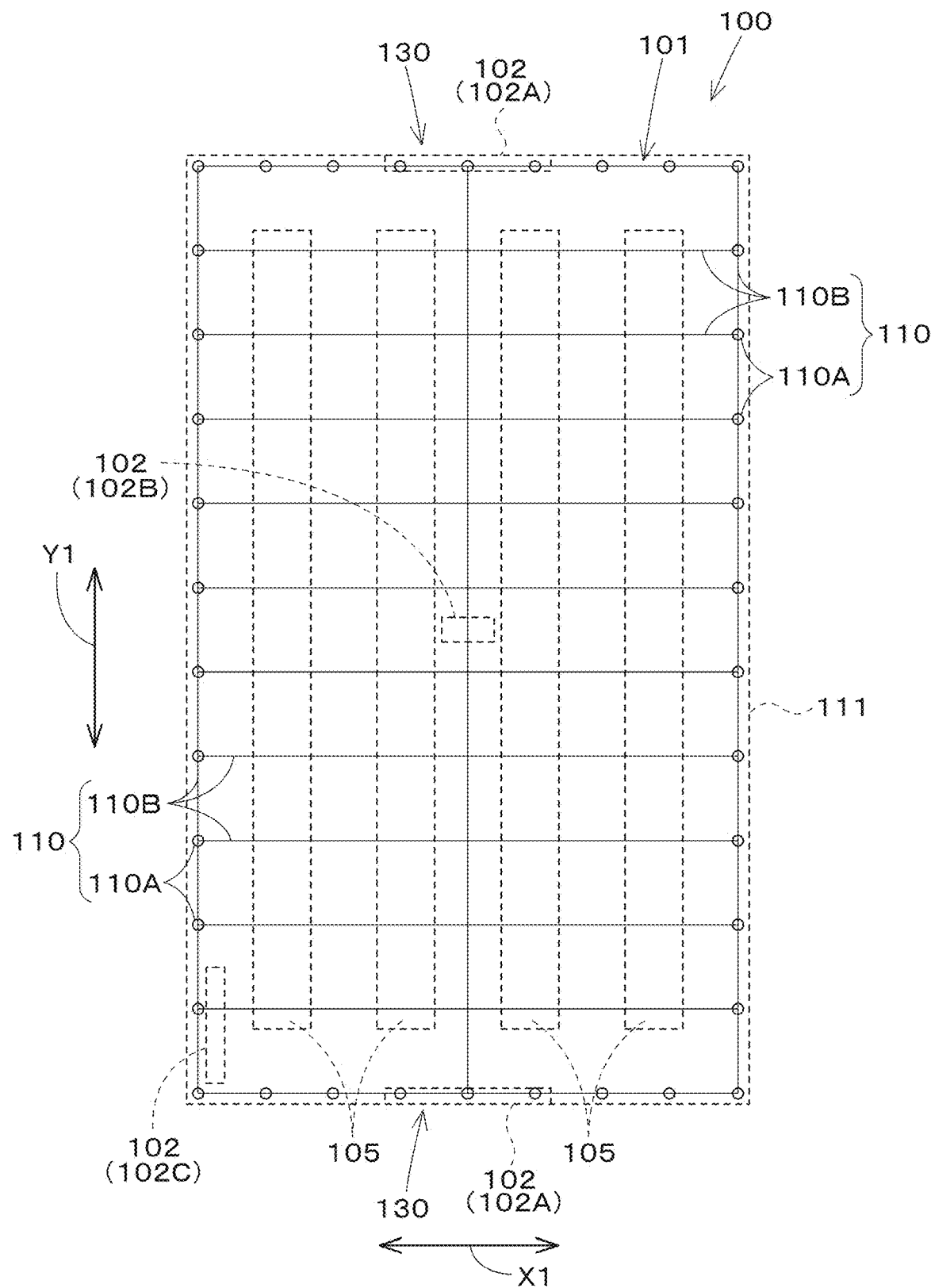
FIG. 17 is a plan view schematically illustrating the facility for protected horticulture according to the first preferred embodiment of the present invention.
Figure 18:
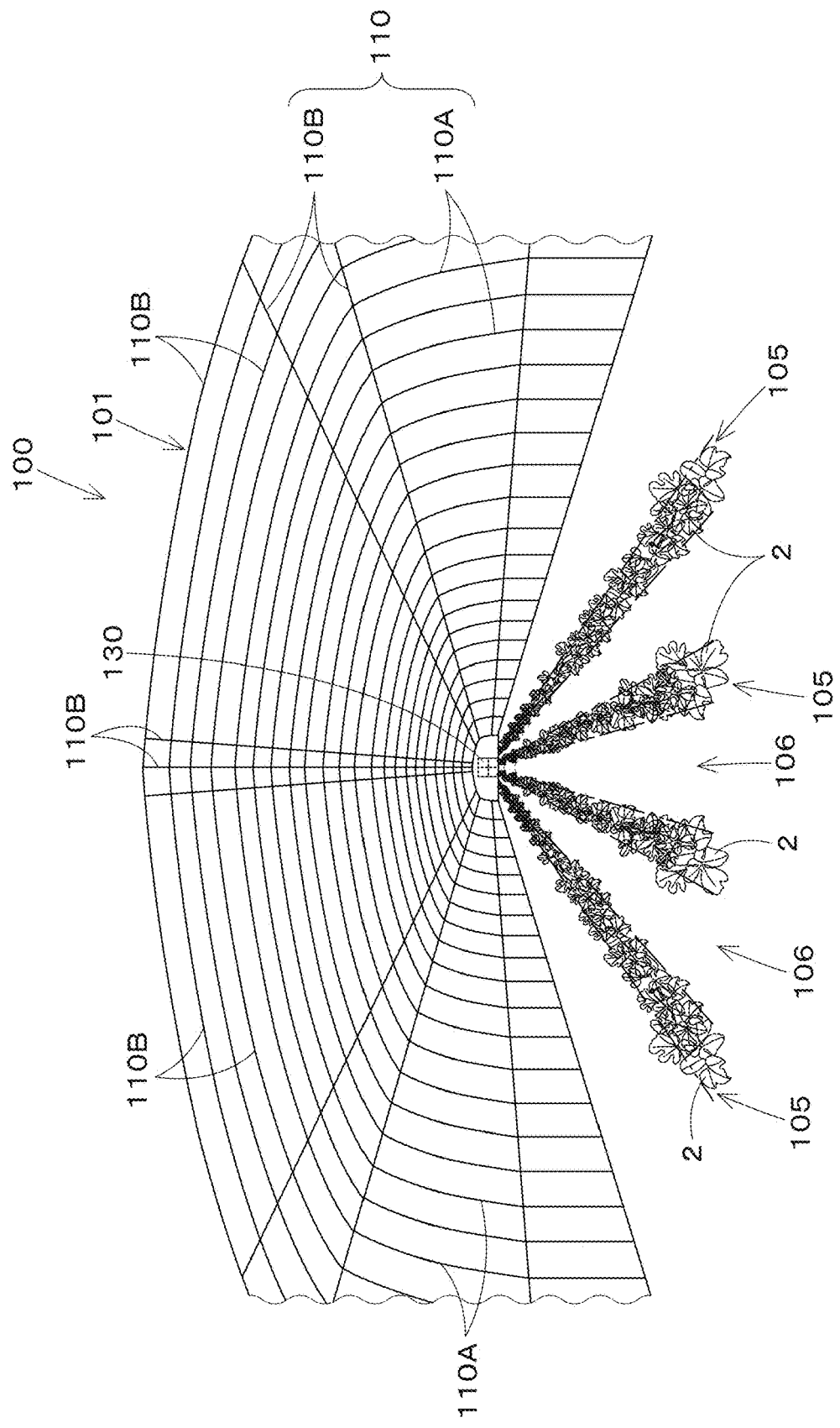
FIG. 18 is a perspective view of the interior of the facility for protected horticulture according to the first preferred embodiment of the present invention in which crops are in their initial stage of growth.
Figure 19:
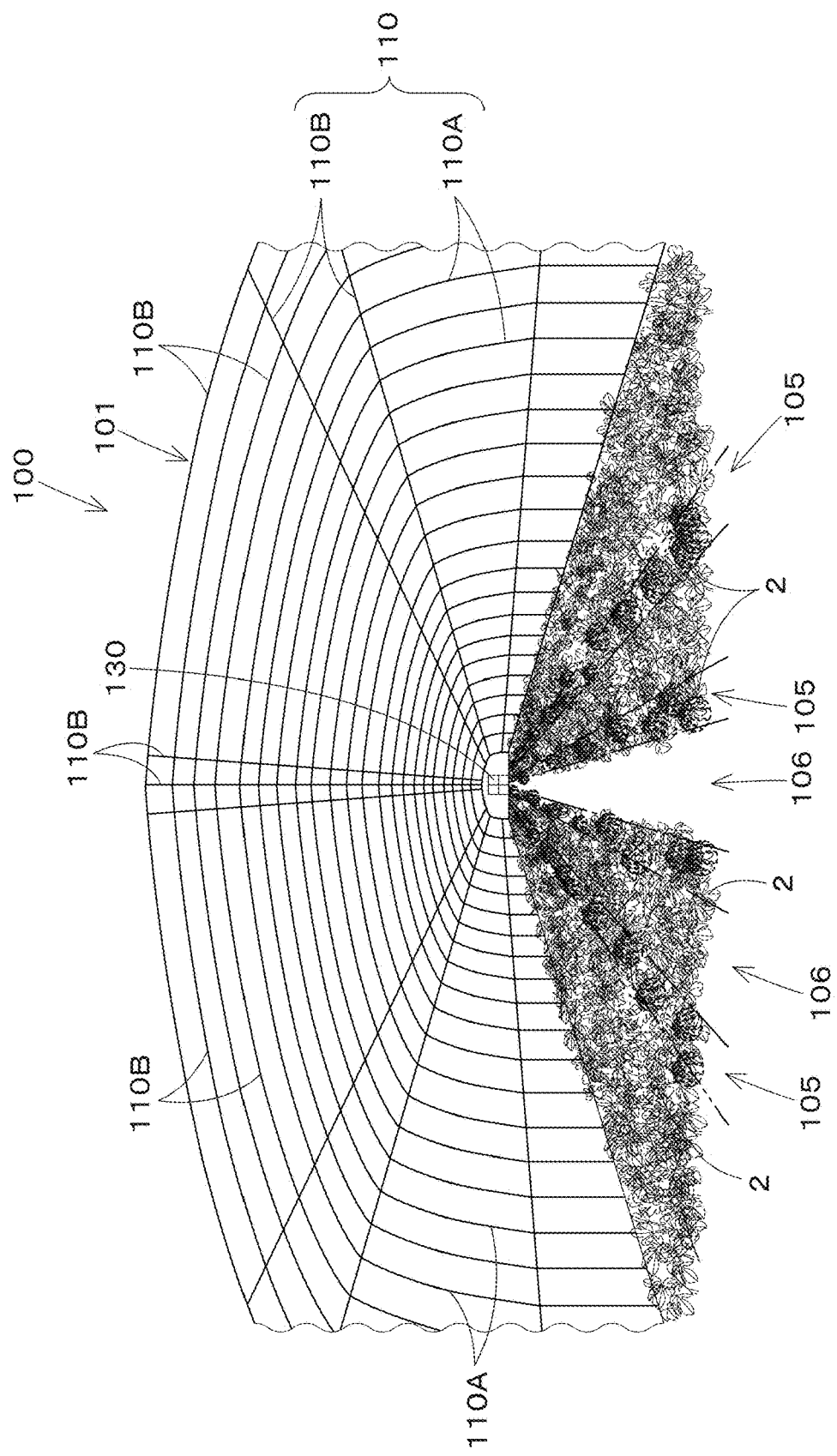
FIG. 19 is a perspective view of the interior of the facility for protected horticulture according to the first preferred embodiment of the present invention in which crops are in their intermediate or late stage of growth.

The house 101 includes a frame 110 and a covering 111. The frame 110 is, for example, a combination of various types of steel such as I-beam(s), H-beam(s), C-beam(s), square beam(s), and/or round beam(s) defining the framework of the facility 100, and includes a plurality of columns 110A and a plurality of connectors 110B. As illustrated in FIGS. 16 to 18, the columns 110A extend upward from the ground or the like, are arranged at predetermined intervals in a widthwise direction X1, and are arranged at predetermined intervals in a longitudinal direction Y1.

Some of the connectors 110B connect together the upper ends of columns 110A spaced apart from each other in the widthwise direction Xl. Some of the connectors 110B connect together columns 110A spaced apart from each other in the lengthwise direction Yl.

The covering 111 is transparent to light which at least allows passage of sunlight, such as synthetic resin and/or glass. For example, the covering 111 covers the entire frame 110 on the outside of the frame 110. In other words, the covering 111 is located on the outside of the columns 110A and on the outside of the connectors 110B.

The equipment 102 includes various types of equipment for use in cultivation of the crops 2 that are capable of adjusting the temperature, humidity, air flow, and/or the like in the house 101. Specifically, the equipment 102 includes a ventilator 102A, a circulator 102B, a heat exchanger 102C, and/or the like. As illustrated in FIGS. 16 and 17, the ventilator 102A is located on an entrance 130 side of the house 101, and allows inside air to go out of the house 101 and allows outside air to enter the house 101.

The circulator 102B is located inside the house 101 to allow air inside the house 101 to circulate in a predetermined direction. The heat exchanger 102C is capable of changing the temperature in the house 101, and includes, for example, a heat pump. The above-described pieces of equipment 102 are examples, and the equipment 102 may include a watering device, a light device, a sprayer, and/or the like. There is no limitation on the equipment 102.

The agricultural robot 1 does various types of agricultural work relating to crop(s) 2 cultivated in cultivation area(s) 105 in the facility 100, such as, for example, harvesting the crops 2, spreading fertilizer, and/or spreading agricultural chemicals. The agricultural robot 1 is an autonomous robot.

Figure 6:
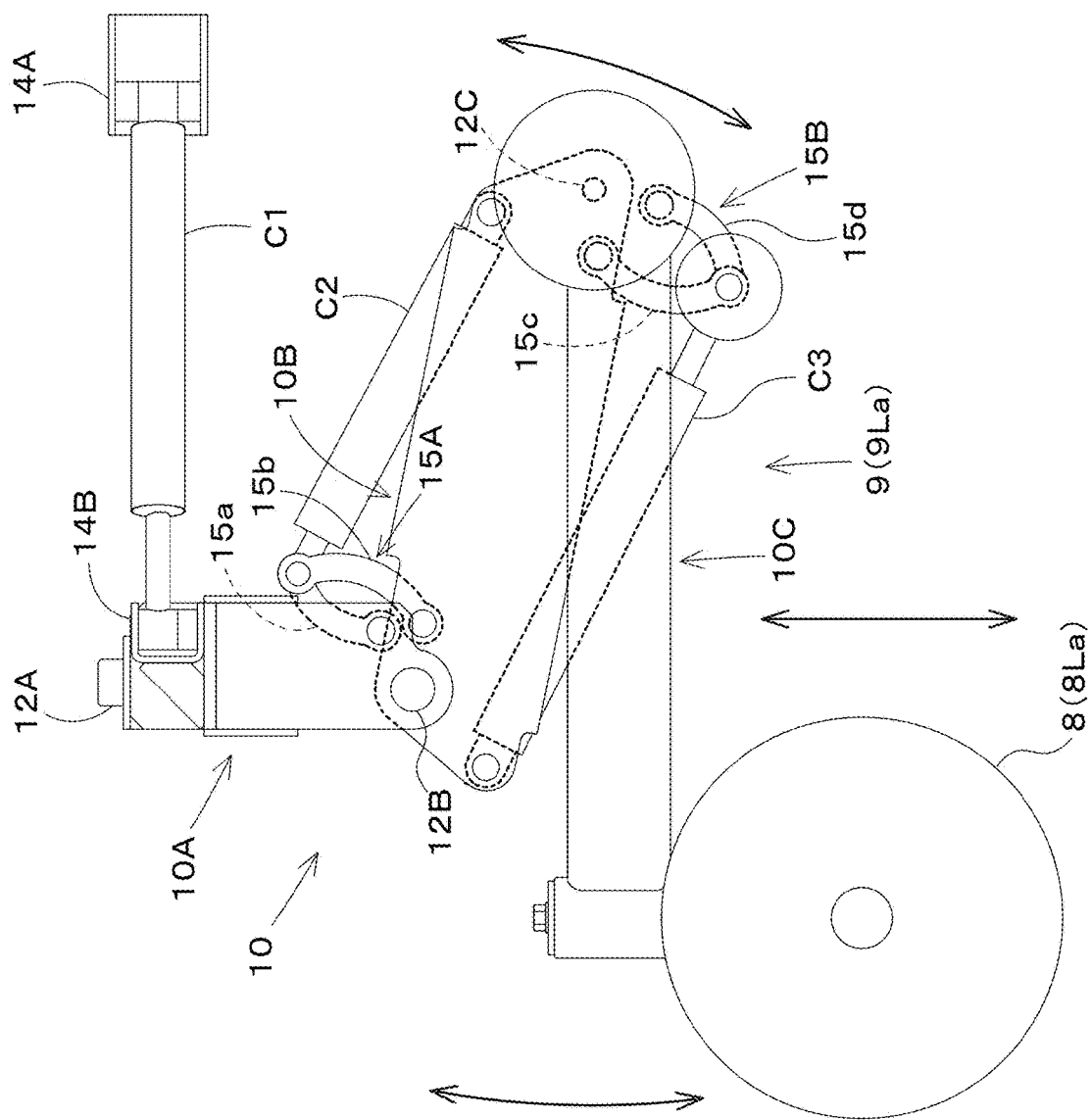
FIG. 6 is a side view of a traveling device according to the first preferred embodiment of the present invention.
Figure 7:
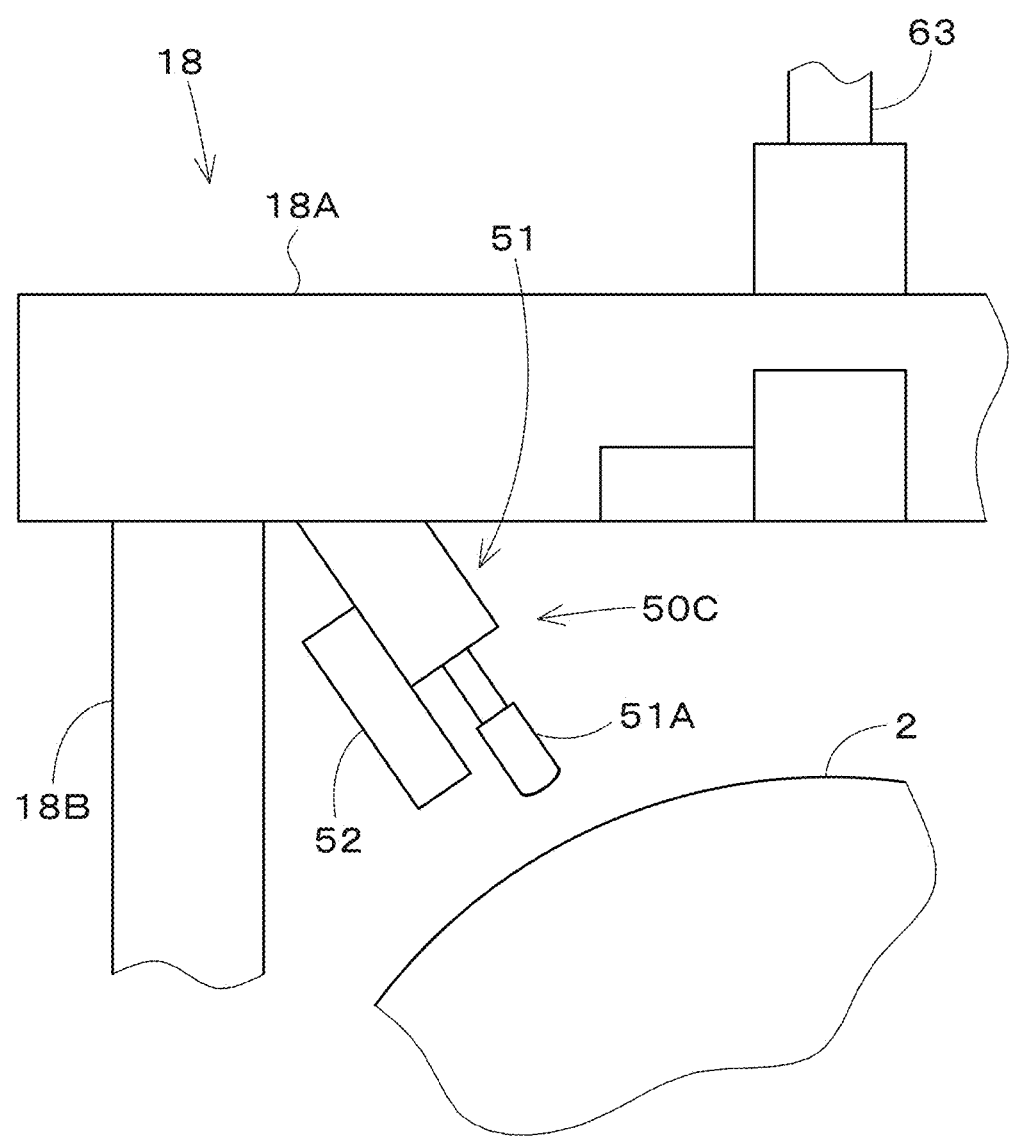
FIG. 7 is an enlarged view of a portion of a robot hand according to the first preferred embodiment of the present invention.
Figure 8:
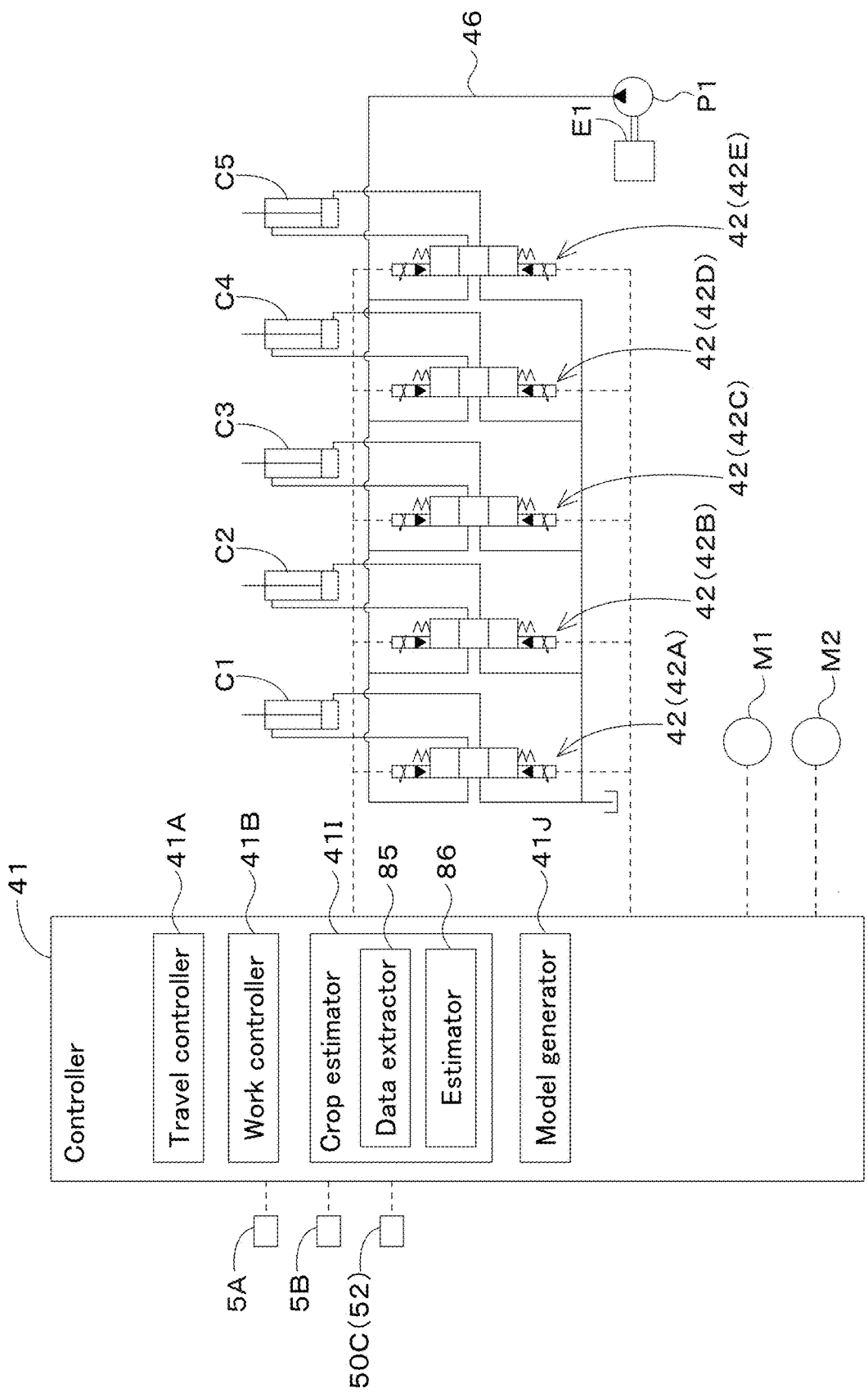
FIG. 8 is a general view of an assistance system for an agricultural robot according to the first preferred embodiment of the present invention.

FIGS. 1 to 7 illustrate the agricultural robot 1. FIG. 8 illustrates an assistance system for an agricultural robot.

The following description discusses the agricultural robot 1 and the assistance system for an agricultural robot in detail. In the following description, the direction indicated by arrow A1 in FIGS. 1 and 2 is referred to as a forward direction, the direction indicated by arrow A2 in FIGS. 1 and 2 is referred to as a rearward direction, and the direction indicated by arrow A3 in FIG. 1 is referred to as a front-rear direction. Accordingly, the direction indicated by arrow B1 in FIG. 5 (direction to the near side in FIG. 1) is a leftward direction, and the direction indicated by arrow B2 in FIG. 5 (direction to the far side in FIG. 1) is a rightward direction. A horizontal direction orthogonal to the front-rear direction A3 is referred to a machine body width direction (direction indicated by arrow B3 in FIG. 5).

As illustrated in FIG. 1, the agricultural robot 1 includes a traveling body 3 to travel autonomously. The traveling body 3 includes a machine body 6 and a traveling device 7 supporting the machine body 6 such that the machine body 6 is allowed to travel.

Figure 3:
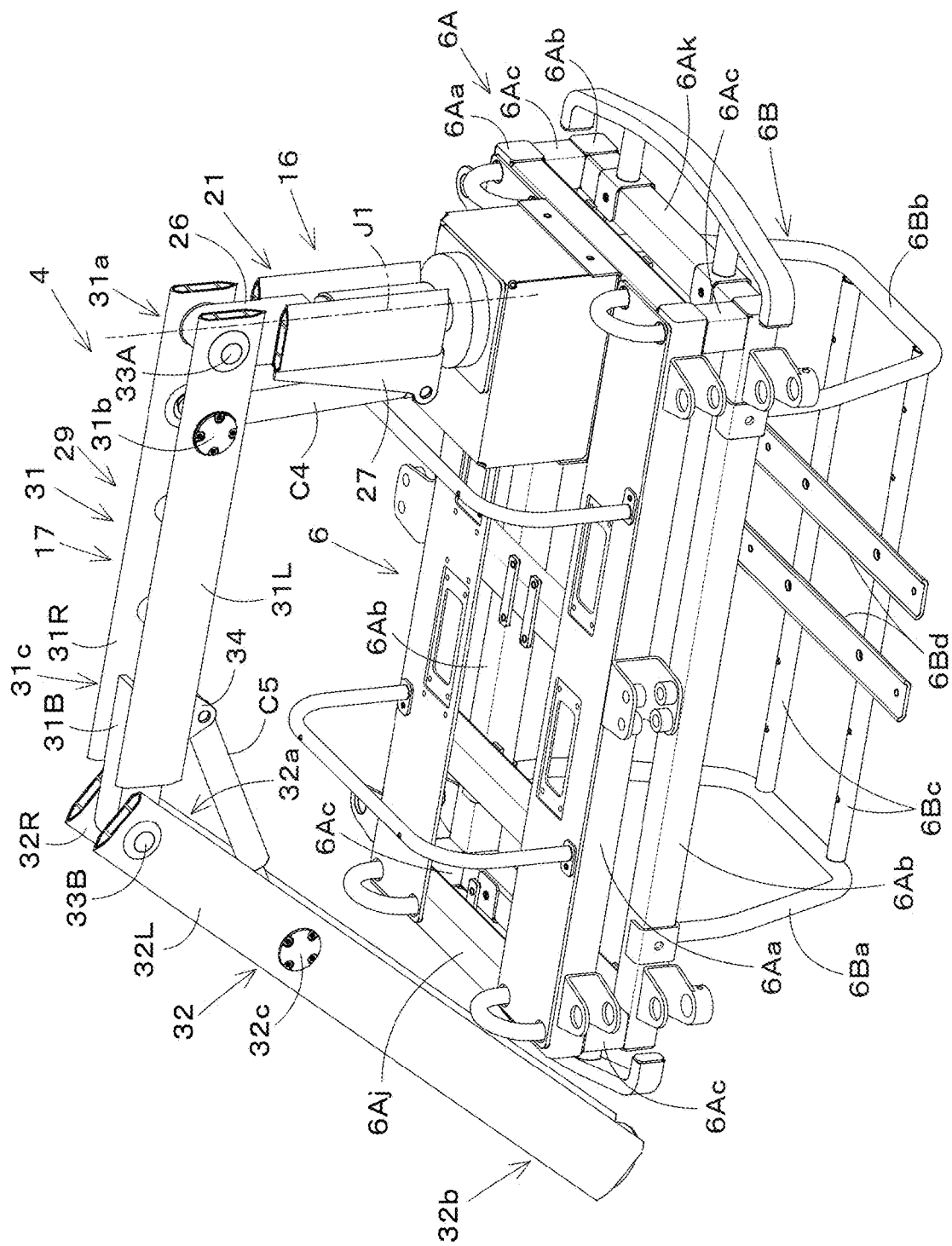
FIG. 3 is a perspective view of a machine body and a manipulator according to the first preferred embodiment of the present invention.
Figure 4:
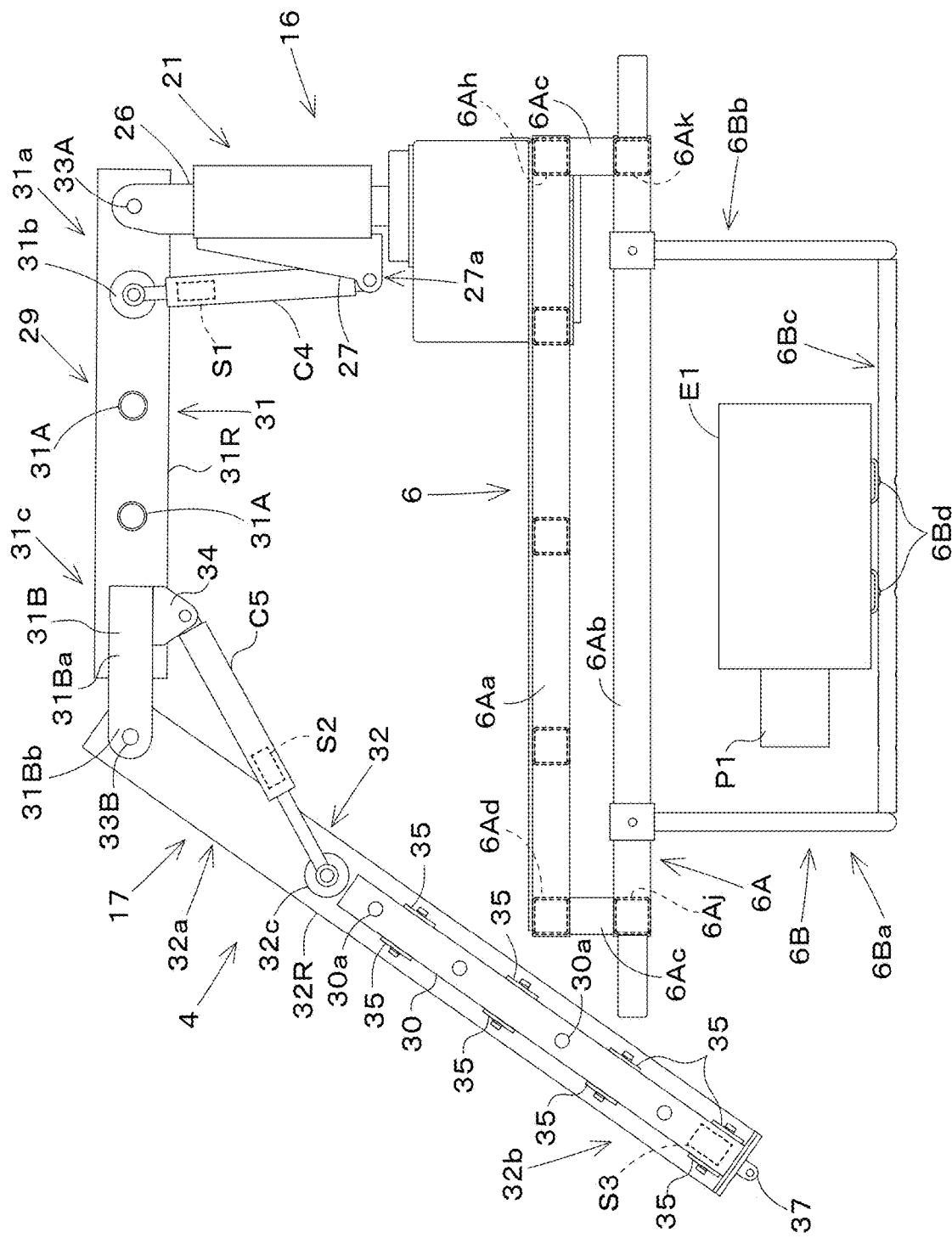
FIG. 4 is a side view of the machine body and the manipulator according to the first preferred embodiment of the present invention.

As illustrated in FIGS. 3 and 4, the machine body 6 includes a main frame 6A and a prime mover frame 6B. The main frame 6A includes a pair of first frames 6Aa which are arranged with a space therebetween along the machine body width direction B3, and a pair of second frames 6Ab which are located below the respective first frames 6Aa and are arranged with a space therebetween. The first frames 6Aa and the second frames 6Ab are connected by a plurality of vertical frames 6Ac. The vertical frames 6Ac are provided between front portions of the left first frame 6Aa and the left second frame 6Ab, between front portions of the right first frame 6Aa and the right second frame 6Ab, between rear portions of the left first frame 6Aa and the left second frame 6Ab, and between rear portions of the right first frame 6Aa and the right second frame 6Ab.

The left first frame 6Aa and the right first frame 6Aa are connected by first to fifth transverse frames 6Ad to 6Ah located between the first frames 6Aa. The first to fifth transverse frames 6Ad to 6Ah are arranged in parallel to each other along the front-rear direction A3 at intervals from the front ends of the first frames 6Aa to the rear ends of the first frames 6Aa.

Front portions of the second frames 6Ab are connected by a sixth transverse frame 6Aj, and rear portions of the second frames 6Ab are connected by a seventh transverse frame 6Ak.

The prime mover frame 6B is located below the main frame 6A. The prime mover frame 6B includes a front frame 6Ba, a rear frame 6Bb, a plurality of connector frames 6Bc, and a plurality of mount frames 6Bd. The front frame 6Ba has upper portions attached to the front portions of the left and right second frames 6Ab. The rear frame 6Bb has upper portions attached to the rear portions of the left and right second frames 6Ab. The plurality of connector frames 6Bc connect together lower portions of the front frame 6Ba and the rear frame 6Bb. The plurality of mount frames 6Bd are fixed to a middle portion of each of the connector frames 6Bc in the front-rear direction A3.

As illustrated in FIG. 4, a prime mover (engine) E1 is attached to the mount frames 6Bd. A hydraulic pump P1 is attached to the prime mover E1. The hydraulic pump P1 is driven by the prime mover E1. Furthermore, the prime mover frame 6B is equipped with a hydraulic fluid tank (not illustrated) for storing hydraulic fluid to be discharged from the hydraulic pump P1.

Figure 5:
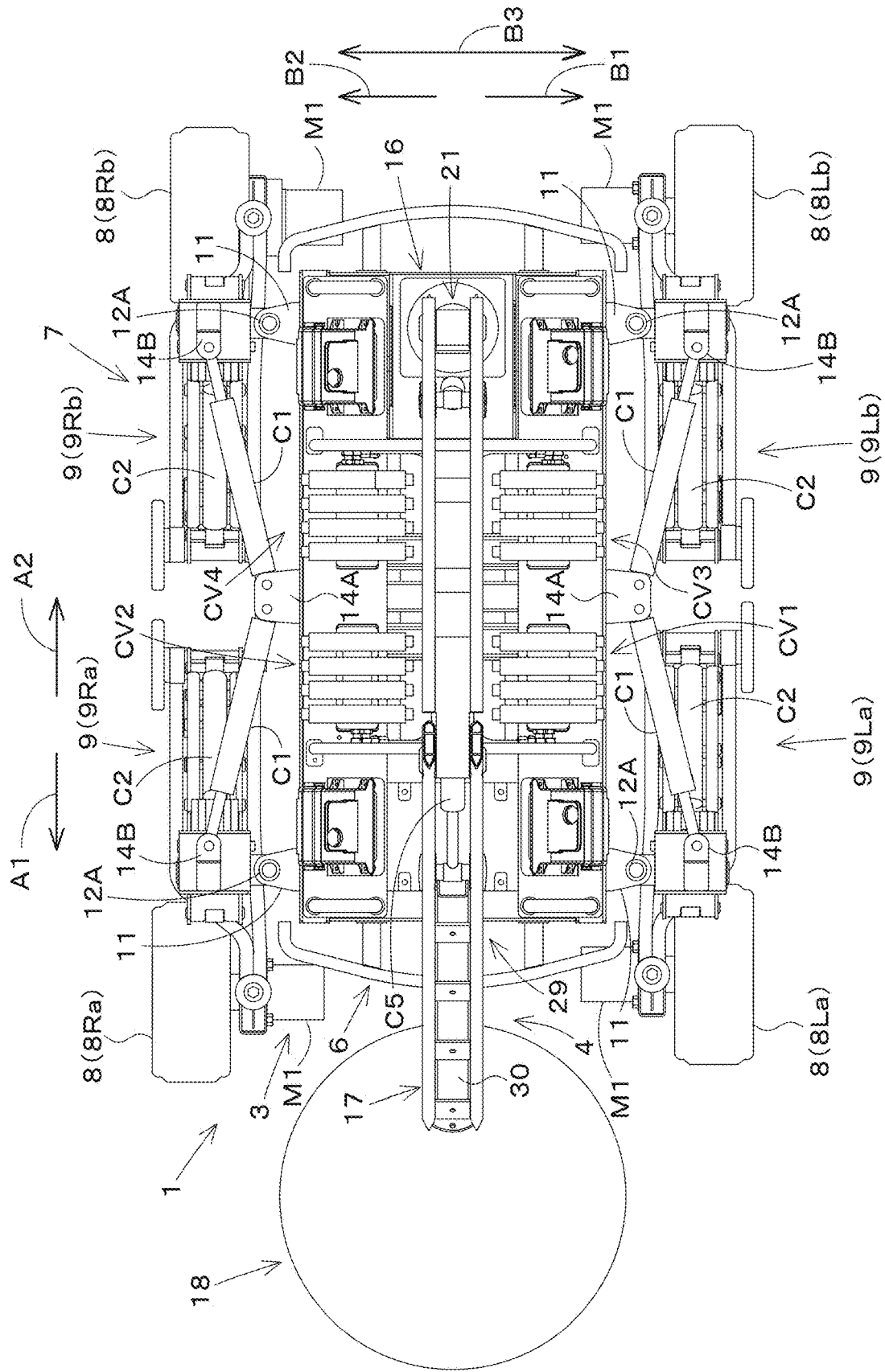
FIG. 5 is a plan view of a traveling device according to the first preferred embodiment of the present invention.

As illustrated in FIG. 5, the main frame 6A (machine body 6) is equipped with a plurality of control valves (first to fourth control valves CV1 to CV4) to control the traveling device 7.

As illustrated in FIGS. 1, 2, and 5, the traveling device 7 is a wheeled (four-wheel) traveling device including four wheels 8. Specifically, the traveling device 7 includes a first wheel 8La (left front wheel) located at the front left of the machine body 6, a second wheel 8Ra (right front wheel) located at the front right of the machine body 6, a third wheel 8Lb (left rear wheel) located at the rear left of the machine body 6, and a fourth wheel 8Rb (right rear wheel) located at the rear right of the machine body 6. Note that the traveling device 7 may be a wheeled traveling device including at least three wheels 8. The traveling device 7 may be a crawler traveling device.

The traveling device 7 includes wheel supports 9 which support the wheels 8. The number of the wheel supports 9 provided corresponds to the number of the wheels 8. Specifically, the traveling device 7 includes a first wheel support 9La which supports the first wheel 8La, a second wheel support 9Ra which supports the second wheel 8Ra, a third wheel support 9Lb which supports the third wheel 8Lb, and a fourth wheel support 9Rb which supports the fourth wheel 8Rb.

As illustrated in FIGS. 5 and 6, each of the wheel supports 9 includes a travel frame 10, a steering cylinder C1, a first lift cylinder C2, a second lift cylinder C3, and a travel motor M1.

The travel frame 10 includes a main support 10A, a swing frame 10B, and a wheel frame 10C. The main support 10A is supported on the machine body 6 such that the main support 10A is rotatable about a vertical axis (axis extending along an up-and-down direction). Specifically, the main support 10A is supported on a support bracket 11 fixed to the machine body 6 such that the main support 10A is rotatable about a first support shaft 12A having an axis extending along the up-and-down direction.

As illustrated in FIG. 5, the support bracket 11 which pivotally supports the first wheel support 9La is provided at the front left of the machine body 6, the support bracket 11 which pivotally supports the second wheel support 9Ra is provided at the front right of the machine body 6, the support bracket 11 which pivotally supports the third wheel support 9Lb is provided at the rear left of the machine body 6, and the support bracket 11 which pivotally supports the fourth wheel support 9Rb is provided at the rear right of the machine body 6.

The swing frame 10B is supported on the main support 10A such that the swing frame 10B is swingable up and down. Specifically, the swing frame 10B has an upper portion supported on the main support 10A via a second support shaft 12B such that the swing frame 10B is pivotable about a sideways axis (axis extending in the machine body width direction B3).

The swing frame 10B of each of the first and second wheel supports 9La and 9Ra has its upper front portion pivoted on a corresponding main support 10A, and the swing frame 10B of each of the third and fourth wheel supports 9Lb and 9Rb has its upper rear portion pivoted on a corresponding main support 10A.

The wheel frame 10C is supported on the swing frame 10B such that the wheel frame 10C is swingable up and down. Specifically, the wheel frame 10C is supported on the swing frame 10B via a third support shaft 12C such that the wheel frame 10C is pivotable about a sideways axis.

The wheel frame 10C of each of the first and second wheel supports 9La and 9Ra has its rear portion pivoted on a rear portion of a corresponding swing frame 10B, and the wheel frame 10C of each of the third and fourth wheel supports 9Lb and 9Rb has its front portion pivoted on a front portion of a corresponding swing frame 10B.

The steering cylinder C1, the first lift cylinder C2, and the second lift cylinder C3 are each a hydraulic cylinder, for example.

The steering cylinder C1 is located between the machine body 6 and the main support 10A. Specifically, the steering cylinder C1 has one end pivoted on a cylinder bracket 14A fixed to a middle portion of a corresponding first frame 6Aa in a front-rear direction A3, and has the opposite end pivoted on a cylinder bracket 14B fixed to the main support 10A. Extension or retraction of the steering cylinder C1 causes the travel frame 10 to swing about the first support shaft 12A, thus changing the orientation of a corresponding wheel 8 (corresponding one of the first to fourth wheels 8La to 8Rb) (steering the wheel 8). With regard to the traveling device 7 in the present preferred embodiment, each of the wheels 8 can be steered independently.

The first lift cylinder C2 has one end pivoted on the swing frame 10B and the opposite end pivoted on a first linkage mechanism 15A. The first linkage mechanism 15A includes a first link 15*a* and a second link 15*b*. The first link 15*a* has one end pivoted on the main support 10A, and the second link 15*b* has one end pivoted on the swing frame 10B. The first link 15*a* and the second link 15*b* each have the opposite end pivoted on the opposite end of the first lift cylinder C2. Extension or retraction of the first lift cylinder C2 causes the swing frame 10B to swing up or down about the second support shaft 12B.

The second lift cylinder C3 has one end pivoted on a front portion of the swing frame 10B and the opposite end pivoted on a second linkage mechanism 15B. The second linkage mechanism 15B includes a first link 15*c* and a second link 15*d*. The first link 15*c* has one end pivoted on the swing frame 10B, and the second link 15*d* has one end pivoted on the wheel frame 10C. The first link 15*c* and the second link 15*d* each have the opposite end pivoted on the opposite end of the second lift cylinder C3. Extension or retraction of the second lift cylinder C3 causes the wheel frame 10C to swing up or down about the third support shaft 12C.

The combination of upward or downward swinging movement of the swing frame 10B caused by the first lift cylinder C2 and the upward or downward swinging movement of the wheel frame 10C caused by the second lift cylinder C3 allows a corresponding one of the wheels 8 to be raised or lowered in a parallel manner.

The travel motor M1 is a hydraulic motor, for example. Such travel motors M1 are provided so as to correspond to the respective wheels 8. Specifically, the traveling device 7 includes a travel motor M1 to drive the first wheel 8La, a travel motor M1 to drive the second wheel 8Ra, a travel motor M1 to drive the third wheel 8Lb, and a travel motor M1 to drive the fourth wheel 8Rb. Each travel motor M1 is located inward of a corresponding wheel 8 in the machine body width direction B3 and is attached to a corresponding wheel frame 10C. Each travel motor M1 is driven by a hydraulic fluid discharged from the hydraulic pump P1 and is rotatable in forward and reverse directions. By changing the direction of rotation of the travel motor M1 between the forward direction and the reverse direction, it is possible to change the direction of rotation of a corresponding wheel 8 between the forward direction and the reverse direction.

The second wheel support 9Ra, the third wheel support 9Lb, and the fourth wheel support 9Rb each include elements similar to those of the first wheel support 9La. The second wheel support 9Ra has a configuration laterally symmetrical to the first wheel support 9La. The third wheel support 9Lb is in the form obtained by a 180 degree rotation of the second wheel support 9Ra about a vertical central axis passing through the center of the machine body 6. The fourth wheel support 9Rb is in the form obtained by a 180 degree rotation of the first wheel support 9La about the central axis.

Hydraulic actuator(s) attached to the first wheel support 9La is/are controlled by the first control valve CV1. Hydraulic actuator(s) attached to the second wheel support 9Ra is/are controlled by the second control valve CV2. Hydraulic actuator(s) attached to the third wheel support 9Lb is/are controlled by the third control valve CV3. Hydraulic actuator(s) attached to the fourth wheel support 9Rb is/are controlled by the fourth control valve CV4.

Thus, the first wheel 8La to the fourth wheel 8Rb can each independently be steered. Furthermore, the first wheel 8La to the fourth wheel 8Rb can each independently be raised and lowered.

With regard to the traveling device 7, the traveling body 3 can be turned by steering the first wheel 8La to the fourth wheel 8Rb. The traveling body 3 can be caused to travel forward by causing the first wheel 8La to the fourth wheel 8Rb to rotate in the forward direction, and the traveling body 3 can be caused to travel rearward by causing the first wheel 8La to the fourth wheel 8Rb to rotate in the reverse direction. The traveling body 3 can be raised or lowered by raising or lowering the first wheel 8La to the fourth wheel 8Rb. The machine body 6 can be tilted forward or rearward by raising or lowering the first wheel 8La and the second wheel 8Ra relative to the third wheel 8Lb and the fourth wheel 8Rb or by raising or lowering the third wheel 8Lb and the fourth wheel 8Rb relative to the first wheel 8La and the second wheel 8Ra. The machine body 6 can be titled such that one of the opposite sides of the machine body 6 in the machine body width direction B3 is higher than the other by raising or lowering the first wheel 8La and the third wheel 8Lb relative to the second wheel 8Ra and the fourth wheel 8Rb or by raising or lowering the second wheel 8Ra and the fourth wheel 8Rb relative to the first wheel 8La and the third wheel 8Lb.

The agricultural robot 1 includes a manipulator 4 (working unit) attached to the traveling body 3. The manipulator (working unit) 4 does work and, for example, in the present preferred embodiment, is at least capable of harvesting a crop 2.

As illustrated in FIGS. 1 and 2, the manipulator 4 includes a mount 16 detachably attached to the traveling body 3 (machine body 6), an arm 17 attached to the mount 16, and a robot hand 18 which is provided on the arm 17 and which is capable of holding the crop (target) 2.

As illustrated in FIG. 1, the mount 16 in the present preferred embodiment is provided at the rear of the traveling body 3. Note that the mount 16 may be provided at the front of the traveling body 3. That is, the mount 16 need only be provided at a location offset, in one direction, from the center of the traveling body 3 in the front-rear direction A3. In the present preferred embodiment, the agricultural robot 1 does harvesting work as the traveling body 3 travels forward, and therefore the mount 16 is provided at a location offset in a direction opposite to the direction of travel. The mount 16 is in the form of a box and is detachably attached to the traveling body 3.

The mount 16 has a rotating frame 21 extending upward. The rotating frame 21 can be caused to rotate about a rotation axis J1 by a rotary motor M2 provided inside the mount 16. The rotation of the rotating frame 21 causes the robot hand 18 to move (change in position) along a circumference centered on the rotation axis J1.

As illustrated in FIGS. 3 and 4, the arm 17 is supported on the rotating frame 21 such that the arm 17 is swingable up and down, and is bendable at a lengthwise intermediate portion thereof. The arm 17 includes a main arm 29 and a sub-arm 30.

The main arm 29 is pivoted on the rotating frame 21 such that the main arm 29 is swingable up and down, and is bendable. Specifically, the main arm 29 includes a first arm assembly 31 pivoted on the rotating frame 21 such that the main arm 29 is swingable up and down, and a second arm assembly 32 swingably pivoted on the first arm assembly 31, and is capable of being bent by the swinging movement of the second arm assembly 32 relative to the first arm assembly 31.

The first arm assembly 31 has a proximal portion 31*a* pivoted on an arm bracket 26. As illustrated in FIG. 3, the first arm assembly 31 includes a first arm frame 31L and a second arm frame 31R. The first arm frame 31L and the second arm frame 31R are arranged along the machine body width direction B3 and are connected to each other by connector pipe(s) 31A and/or the like. An upper portion of the arm bracket 26 is inserted between proximal portions 31*a* of the first arm frame 31L and the second arm frame 31R, and the proximal portions 31*a* of the first arm frame 31L and the second arm frame 31R are supported on the arm bracket 26 via an arm pivot shaft 33A (referred to as a "first arm pivot shaft") which has an axis extending along the machine body width direction B3 such that the proximal portions 31*a* of the first arm frame 31L and the second arm frame 31R are pivotable about the axis of the first arm pivot shaft 33A.

The first arm frame 31L and the second arm frame 31R are each defined by a hollow member. The length of the first arm assembly 31 is less than a dimension of the traveling body 3 (machine body 6) in the front-rear direction A3.

As illustrated in FIG. 4, the first arm assembly 31 includes a cylinder mount 31*b* which is in the proximal portion 31*a* and which is closer to a distal portion 31*c* than the first arm pivot shaft 33A is to the distal end portion 31*c*. A first arm cylinder (first hydraulic cylinder) C4 is provided to bridge the cylinder mount 31*b* and a cylinder mount portion 27*a* of a cylinder bracket 27. The first arm cylinder C4 is driven by hydraulic fluid discharged from the hydraulic pump P1 provided on the traveling body 3 to extend or retract. The extension or retraction of the first arm cylinder C4 causes the first arm assembly 31 to swing up or down. The upward or downward swinging movement of the first arm assembly 31 (arm 17) causes the robot hand 18 to be raised or lowered. The first arm cylinder C4 is provided with a first stroke sensor to detect strokes of the first arm cylinder C4.

As illustrated in FIG. 4, the first arm assembly 31 has a pivotally supporting member 31B fixed to the distal portion 31*c* thereof. Specifically, the pivotally supporting member 31B includes a proximal portion 31Ba inserted between the first arm frame 31L and the second arm frame 31R, and is fixed to the first arm frame 31L and the second arm frame 31R. The pivotally supporting member 31B has a cylinder stay 34 attached to a lower surface of the proximal portion 31Ba. A distal portion 31Bb of the pivotally supporting member 31B projects forward from the first arm frame 31L and the second arm frame 31R.

As illustrated in FIG. 3, the length of the second arm assembly 32 is greater than the length of the first arm assembly 31. The second arm assembly 32 has a proximal portion 32*a* pivoted on the distal portion 31Bb of the pivotally supporting member 31B. The second arm assembly 32 includes a third arm frame 32L and a fourth arm frame 32R. The third arm frame 32L and the fourth arm frame 32R are arranged along the machine body width direction B3, and are connected to each other by a plurality of connector plates 35. The third arm frame 32L and the fourth arm frame 32R are each defined by a hollow member. The distal portion 31Bb of the pivotally supporting member 31B is inserted between proximal portions 32*a* of the third arm frame 32L and the fourth arm frame 32R. The third arm frame 32L and the fourth arm frame 32R (second arm assembly 32) are pivoted on the pivotally supporting member 31B via an arm pivot shaft (referred to as a "second arm pivot shaft") 33B having an axis extending along the machine body width direction B3.

The second arm assembly 32 includes a cylinder mount 32*c* which is in the proximal portion 32*a* and which is closer to a distal portion 32*b* than the second arm pivot shaft 33B is to the distal portion 32*b*. A second arm cylinder (second hydraulic cylinder) C5 is provided to bridge the cylinder mount 32*c* and the cylinder stay 34. The second arm cylinder C5 is driven by hydraulic fluid discharged from the hydraulic pump P1 provided on the traveling body 3 to extend and retract. The extension or retraction of the second arm cylinder C5 causes the second arm assembly 32 to swing relative to the first arm assembly 31, causing the main arm 29 (arm 17) to be bent or stretched. Note that, in the present preferred embodiment, the main arm 29 in a fully stretched state defines a straight line, but the main arm 29 in a fully stretched state may be bent to some extent.

Furthermore, the extension or retraction of the second arm cylinder C5 allows the robot hand 18 to move away from or toward the traveling body 3. Specifically, the extension of the second arm cylinder C5 allows the robot hand 18 to move in a direction away from the traveling body 3, and the retraction of the second arm cylinder C5 allows the robot hand 18 to move in a direction toward the traveling body 3.

As illustrated in FIG. 4, the second arm cylinder C5 is provided with a second stroke sensor S2 to detect strokes of the second arm cylinder C5.

The sub-arm 30 is provided such that the sub-arm 30 can extend and retract relative to the second arm assembly 32. Therefore, the extension or retraction of the sub-arm 30 makes it possible to increase or reduce the length of the arm 17. The sub-arm 30 includes a square pipe in the form of a straight line. The sub-arm 30 is supported between distal portions (front portions) of the third arm frame 32L and the fourth arm frame 32R such that the sub-arm 30 is movable along a longitudinal direction. Furthermore, the sub-arm 30 is located between connector plates 35 facing each other, and can be fixed to the connector plates 35 with fixing member(s) such as bolt(s). The sub-arm 30 includes, on one side surface, protrusion(s) 30a which abut(s) the third arm frame 32L, and includes, on the opposite side surface, another protrusion(s) 30a which abut(s) the fourth arm frame 32R. The protrusions 30a make it possible to prevent or reduce the rattle of the sub-arm 30.

The sub-arm 30 is, when in a fully retracted position, contained within the space between the third arm frame 32L and the fourth arm frame 32R. Note that the sub-arm 30 in the fully retracted position may project from the second arm assembly 32 to some extent.

As illustrated in FIG. 4, the sub-arm 30 has a hanger plate 37 fixed to a distal portion thereof. The robot hand 18 is pivoted on the hanger plate 37 and is hung on the hanger plate 37 (see FIG. 1). That is, the robot hand 18 is swingably attached to the distal portion of the sub-arm 30. The distal portion of the second arm assembly 32 is provided with a third stroke sensor to measure (detect) the degree of extension of the sub-arm 30 from the second arm assembly 32.

As illustrated in FIGS. 1 and 2, the robot hand 18 includes a base member 18A and a plurality of holding nails 18B. A connecting piece 63 is provided at the upper surface side of the base member 18A. The connecting piece 63 is pivoted on the hanger plate 37. That is, the robot hand 18 is hung on the arm 17. The plurality of holding nails 18B are swingably attached to a lower surface side of the base member 18A. The robot hand 18 is capable of holding a crop 2 between the holding nails 18B (see FIG. 2) and is also capable of releasing the held crop 2, by the swinging movement of the holding nails 18B.

As illustrated in FIGS. 1 and 2, the agricultural robot 1 includes optical sensors 5A and 5B. Each of the optical sensors 5A and 5B includes a Charge Coupled Devices (CCD) camera equipped with a CCD image sensor, a Complementary Metal Oxide Semiconductor (CMOS) camera equipped with a CMOS image sensor, or an infrared camera. In the present preferred embodiment, each of the optical sensors 5A and 5B includes an imager (CCD camera, CMOS camera, or infrared camera). Each of the optical sensors 5A and 5B may include a laser sensor, i.e., Light Detection And Ranging (LiDAR). A laser sensor (LiDAR) is capable of constructing a three-dimensional map of a surrounding area of the traveling body 3 by emitting pulsed infrared light or the like several millions of times per second and measuring the time from the emission to the return of the infrared light.

The optical sensor 5A is attached to the rotating frame 21. Specifically, the optical sensor 5A is attached to an upper portion of the arm bracket 26 via a supporting pillar 40. This does not imply any limitation, and the optical sensor 5A may be attached to the traveling body 3 and/or the like. A plurality of the optical sensors 5A may be provided at a plurality of locations. That is, the agricultural robot 1 may include a plurality of the optical sensors 5A. The optical sensor 5A is capable of capturing an image of the surrounding area of the traveling body 3, and acquires information about the surrounding area of the traveling body 3 by capturing an image.

The optical sensor 5B is attached to a distal portion of the second arm assembly 32. The optical sensor 5B is capable of acquiring quality information by capturing an image of a crop 2. The quality information includes, for example, the size, shape, color, pattern (stripes on watermelon), damage, and/or the like of the crop 2.

As illustrated in FIGS. 1 and 2, the agricultural robot 1 includes a tap sound sensor 50C. The tap sound sensor 50C acquires a tap sound that the crop 2 produces when hit (when tapped). As illustrated in FIG. 7, the tap sound sensor 50C is provided on the robot hand 18 (base member 18A).

The tap sound sensor 50C includes a tapping mechanism 51 and a sound recording mechanism 52. The tapping mechanism 51 includes a tapping member 51A movable toward and away from a crop 2 held with the holding nails 18B. The tapping member 51A is connected to an actuator 51B to cause the tapping member 51A to move in an axial direction. The actuator 51B is, for example, an electric actuator, and causes the tapping member 51A to move in the axial direction in accordance with a control signal to tap the crop 2 to cause the crop 2 to produce a tap sound. The sound recording mechanism 52 includes a microphone (highly directional microphone), and records (stores) a tap sound that the crop 2 produces when tapped with the tapping member 51A.

As illustrated in FIG. 8, the agricultural robot 1 includes a controller 41. The controller 41 includes, for example, a microcomputer or the like including a central processing unit (CPU), an electrically erasable programmable read-only memory (EEPROM), and/or the like.

The controller 41 has connected thereto the optical sensors 5A and 5B, the tap sound sensor 50C, the travel motors M1, and the rotary motor M2. The controller 41 has also connected thereto a plurality of control valves 42. The control valves 42 include first control valves 42A, second control valves 42B, third control valves 42C, a fourth control valve 42D, and a fifth control valve 42E.

Each first control valve 42A controls a corresponding steering cylinder C1, each second control valve 42B controls a corresponding first lift cylinder C2, each third control valve 42C controls a corresponding second lift cylinder C3, the fourth control valve 42D controls the first arm cylinder C4, and the fifth control valve 42E controls the second arm cylinder C5.

The first control valves 42A, the second control valves 42B, the third control valves 42C, the fourth control valve 42D, and the fifth control valve 42E are each, for example, a solenoid valve actuated according to a control signal from the controller 41. More specifically, the first control valves 42A, the second control valves 42B, the third control valves 42C, the fourth control valve 42D, and the fifth control valve 42E are each a solenoid valve (three-way solenoid valve) whish achieves multi-position switching according to a control signal.

Upon output of a control signal from the controller 41 to the first control valves 42A, the first control valves 42A are switched to a predetermined position according to the control signal. Upon output of a control signal from the controller 41 to the second control valves 42B, the second control valves 42B are switched to a predetermined position according to the control signal.

Upon output of a control signal from the controller 41 to the third control valves 42C, the third control valves 42C are switched to a predetermined position according to the control signal. Upon output of a control signal from the controller 41 to the fourth control valve 42D, the fourth control valve 42D is switched to a predetermined position according to the control signal. Upon output of a control signal from the controller 41 to the fifth control valve 42E, the fifth control valve 42E is switched to a predetermined position according to the control signal.

The first control valves 42A, the second control valves 42B, the third control valves 42C, the fourth control valve 42D, and the fifth control valve 42E have a fluid passage 46 connected thereto, and the fluid passage 46 has connected thereto the hydraulic pump P1 to deliver hydraulic fluid.

With this, each first control valve 42A, switched between different positions, allows hydraulic fluid to be supplied selectively to either a bottom side chamber of a corresponding steering cylinder C1 or a rod side chamber of the corresponding steering cylinder C1, causing the steering cylinder C1 to extend or retract. Each second control valve 42B, switched between different positions, allows hydraulic fluid to be supplied selectively to either a bottom side chamber of a corresponding first lift cylinder C2 or a rod side chamber of the corresponding first lift cylinder C2, causing the first lift cylinder C2 to extend or retract. Each third control valve 42C, switched between different positions, allows hydraulic fluid to be supplied selectively to either a bottom side chamber of a corresponding second lift cylinder C3 or a rod side chamber of the corresponding second lift cylinder C3, causing the second lift cylinder C3 to extend or retract.

The fourth control valve 42D, switched between different positions, allows hydraulic fluid to be supplied selectively to either a bottom side chamber of the first arm cylinder C4 or a rod side chamber of the first arm cylinder C4, causing the first arm cylinder C4 to extend or retract. The fifth control valve 42E, switched between different positions, allows hydraulic fluid to be supplied selectively to either a bottom side chamber of the second arm cylinder C5 or a rod side chamber of the second arm cylinder C5, causing the second arm cylinder C5 to extend or retract.

The agricultural robot 1 includes a travel controller 41A. The travel controller 41A includes electric/electronic circuit(s) provided in the controller 41, program(s) stored in the controller 41, and/or the like.

The travel controller 41A controls the traveling device 7. Specifically, the travel controller 41A controls the steering cylinders C1 (first control valves 42A) and the travel motors M1. The travel controller 41A outputs a control signal to one or more of the first control valves 42A to cause corresponding one or more steering cylinders C1 to extend or retract to change the steering direction of the traveling device 7 (machine body 6). The travel controller 41A outputs a control signal to one or more of the travel motors M1 to change the rotation speed or the rotation direction of the travel motor(s) M1 to change the speed of the traveling device 7 (machine body 6) or the direction of travel of the traveling device 7 (machine body 6).

The travel controller 41A may also control the raising/lowering, tilting, and/or the like of the machine body 6. For example, the travel controller 41A outputs a control signal to one or more of the second control valves 42B to cause corresponding one or more of the first lift cylinders C2 to extend or retract to change the raised state, lowered state, and/or tilting state of the machine body 6. The travel controller 41A outputs a control signal to one or more of the third control valves 42C to cause corresponding one or more of the second lift cylinders C3 to extend or retract to change the raised state, lowered state, or tilting state of the machine body 6.

As such, the agricultural robot 1 is controlled by the travel controller 41A to autonomously travel in, for example, the facility 100.

The agricultural robot 1 includes a work controller 41B. The work controller 41B is electric/electronic circuit(s) provided in the controller 41, program(s) stored in the controller 41, and/or the like.

The work controller 41B controls the manipulator (working unit) 4. Specifically, the work controller 41B controls the first arm cylinder C4, the second arm cylinder C5, and the rotary motor M2. The work controller 41B outputs a control signal to the fourth control valve 42D to cause the first arm cylinder C4 to extend or retract to cause the first arm assembly 31 to swing. The work controller 41B outputs a control signal to the fifth control valve 42E to cause the second arm cylinder C5 to extract or retract to cause the second arm assembly 32 to swing. The work controller 41B outputs a control signal to the rotary motor M2 to change the rotation direction of the rotary motor M2 to cause the manipulator (working unit) 4 to rotate.

As has been discussed, the work controller 41B is capable of moving the robot hand 18 to any (desired) position. Specifically, it is possible to move the robot hand 18 to a target position by the movement of the robot hand 18 along a circumference centered on the rotation axis J1 caused by the rotation of the rotating frame 21, raising/lowering of the robot hand 18 caused by upward/downward swinging movement of the first arm assembly 31, and the movement of the robot hand 18 toward/away from the traveling body 3 caused by the swinging movement of the second arm assembly 32.

The work controller 41B controls the actuator 51B (tapping member 51A). For example, the work controller 41B performs the following control (tapping control): the work controller 41B outputs a control signal to the actuator 51B to actuate the actuator 51B to cause the tapping member 51A to tap the crop 2.

As illustrated in FIG. 8, the agricultural robot 1 includes a crop estimator 411. The crop estimator 411 includes electric/electronic circuit(s) provided in the controller 41, program(s) stored in the controller 41, and/or the like.

The crop estimator 411 performs estimation of a crop 2 based on sensor data obtained by the optical sensor 5A and/or the optical sensor 5B. When the optical sensor 5A or the optical sensor 5B is an imager, the sensor data is a captured image (image data). When the optical sensor 5A or the optical sensor 5B is a laser sensor (LiDAR), the sensor data is scanned data including the distance and direction from the optical sensor 5A or the optical sensor 5B to the sensed target (object).

Figure 9:
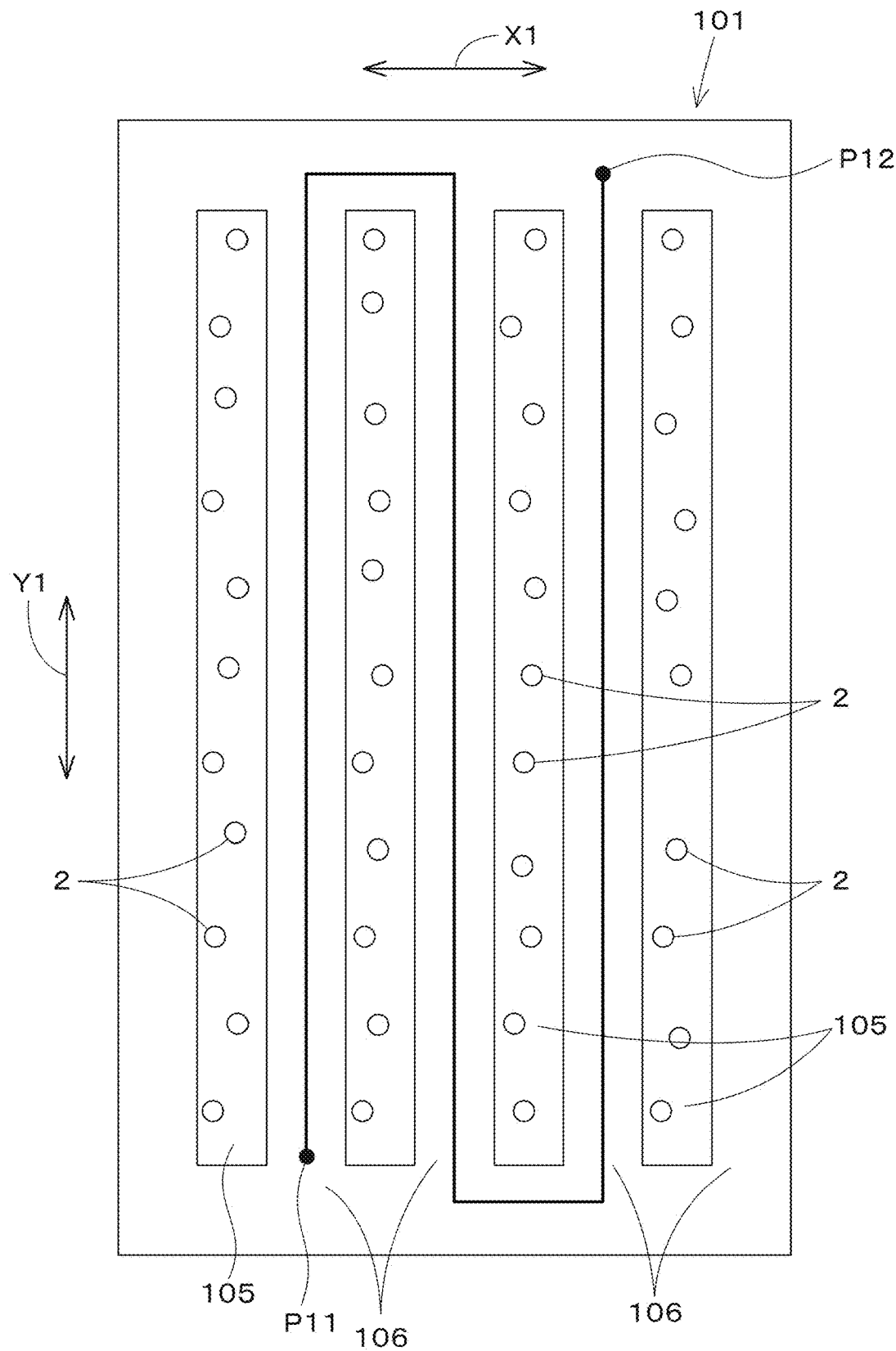
FIG. 9 illustrates a route along which the agricultural robot according to the first preferred embodiment of the present invention has traveled in a facility.

As illustrated in FIG. 9, when work such as harvesting is done by the agricultural robot 1, the agricultural robot 1 is caused to travel through passage(s) 106 between cultivation areas 105 in the facility 100. For example, during the work, the agricultural robot 1 is caused to travel along the cultivation area(s) 105 (passage(s) 106) from the work start point P11 to the work end point P12.

Figure 11:
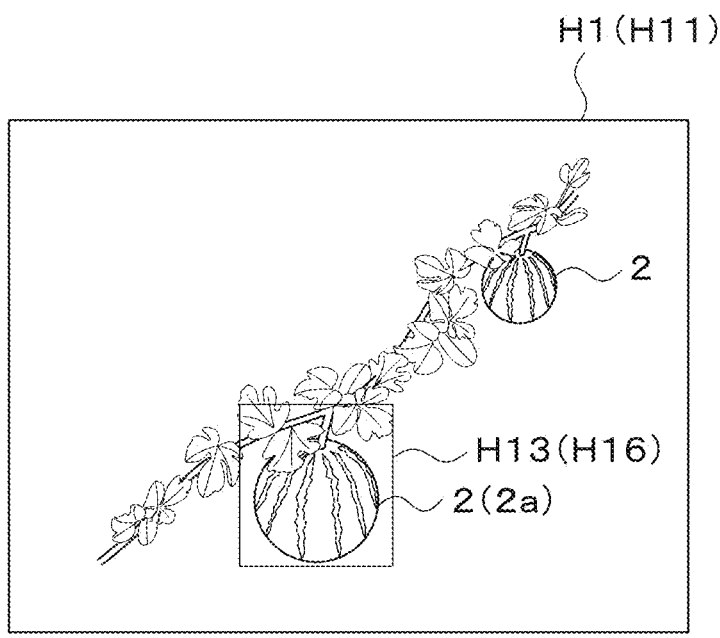
FIG. 11 illustrates a relationship between sensor data and partial data according to the first preferred embodiment of the present invention.

As illustrated in FIG. 11, during travel of the agricultural robot 1, the crop estimator 411 refers to sensor data (captured image, scanned data) H11 obtained by the optical sensor 5A and/or the optical sensor 5B to perform estimation of crop(s) 2.

The following description discusses the crop estimator 411 in detail.

As illustrated in FIG. 8, the crop estimator 411 includes a data extractor 85 and an estimator 86. The data extractor 85 designates a crop 2 which is to be subjected to the estimation based on the sensor data (captured image, scanned data) H11, and extracts, as partial data H13, the portion of the sensor data (captured image, scanned data) H11 that corresponds to the designated crop and its surrounding area.

Figure 10:
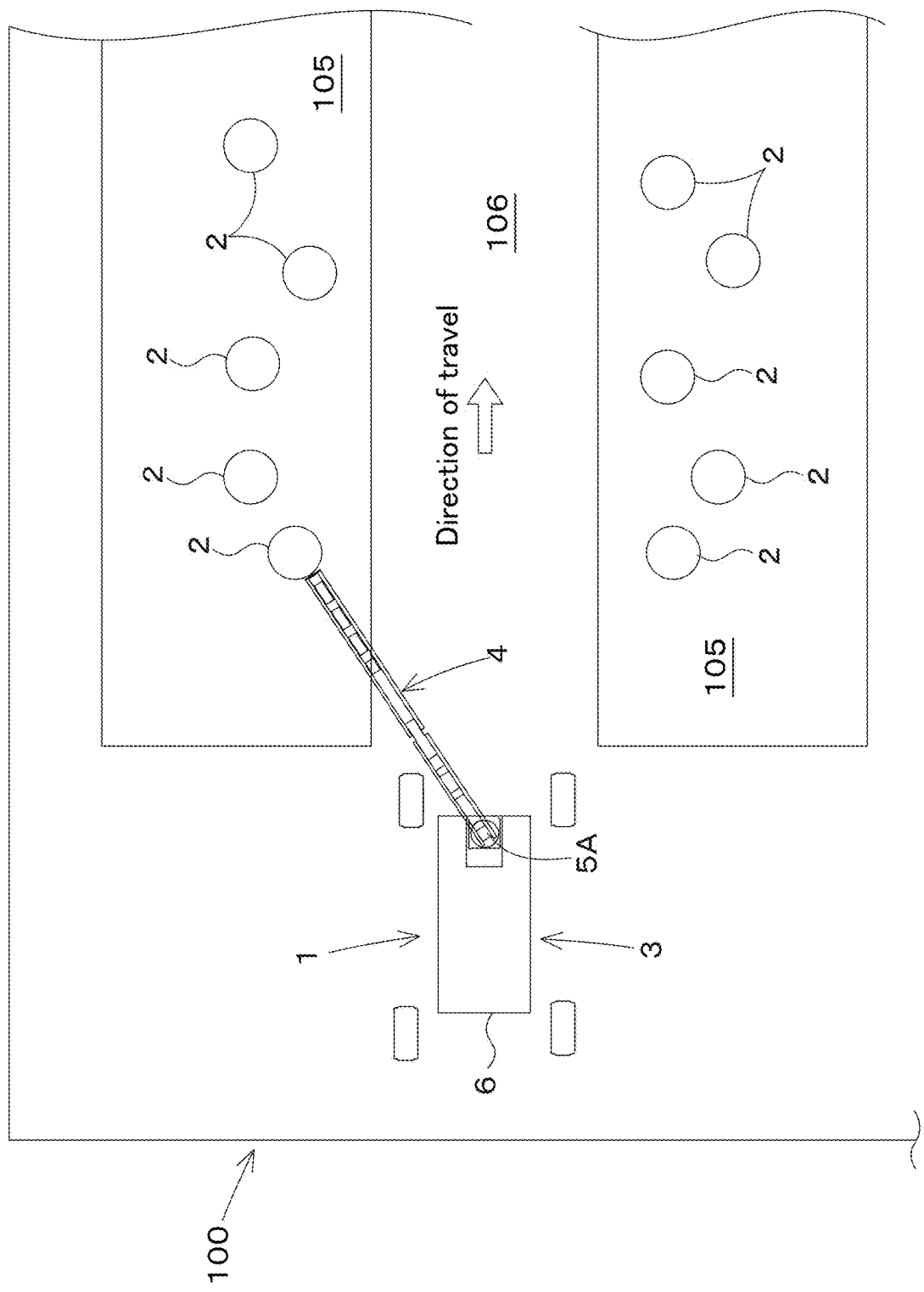
FIG. 10 illustrates how the agricultural robot according to the first preferred embodiment of the present invention does work with respect to crops.

Specifically, first, as illustrated in FIG. 10, when the agricultural robot 1 is caused to travel autonomously in the direction of travel in order to do work with respect to crops 2 under cultivation in the cultivation area 105, the data extractor 85 refers to the sensor data H11 and designates a crop 2 which is to be subjected to estimation. As illustrated in FIG. 11, the data extractor 85 determines whether or not the referenced sensor data H11 includes a portion of a crop 2. In the case where the sensor data H11 is a captured image, the data extractor 85 designates a crop 2 to be subjected to estimation in the captured image by subjecting the captured image to feature matching, pattern matching, and/or the like.

For example, the data extractor 85 compares feature(s) in a predetermined area of the captured image with feature(s) of a prepared image of a crop. If the feature(s) in the predetermined area of the captured image and the feature(s) of the prepared image match each other, the captured image is determined as including a crop 2 in the predetermined area. If the feature(s) in the predetermined area of the captured image and the feature(s) of the prepared image do not match each other, the captured image is determined as not including a crop 2 in the predetermined area.

Alternatively, the data extractor 85 compares an image profile in a predetermined area of the captured image with a prepared reference profile indicative of the pattern on the surface of a crop 2, recesses/protrusions on the crop 2, and/or the like. If the reference profile and the image profile match each other, the captured image is determined as including a crop 2 and/or the like in the predetermined area. If the reference profile and the image profile do not match each other, the captured image is determined as not including a crop 2 in the predetermined area.

Note that, when the sensor data H11 is scanned data, the data extractor 85 determines whether or not an object imaged in the scanned data is a crop 2. In such a case, the data extractor 85 compares the profile of the object in a predetermined area in the data with a reference profile. If the reference profile and the profile in the data match each other, the scanned data is determined as including a crop 2. If the reference profile and the profile in the data do not match each other, the scanned data is determined as not including a crop 2.

That is, the data extractor 85 determines whether or not the sensor data H11 includes a crop 2 by subjecting the captured image to feature matching, pattern matching, and/or the like and/or by subjecting an imaged object to pattern matching and/or the like. If the data extractor 85 determines that the sensor data H11 includes a crop 2, the data extractor 85 designates the crop 2 determined as being included in the sensor data H11.

Figure 12:
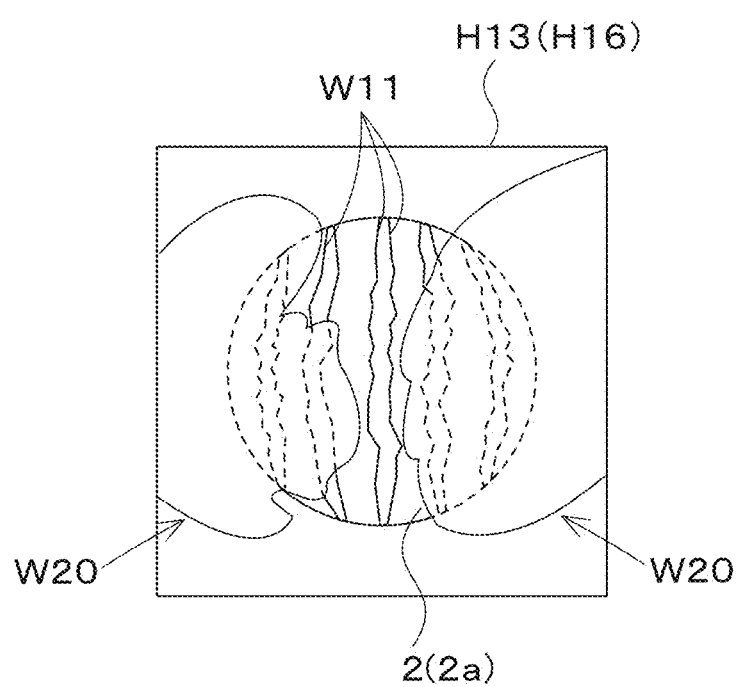
FIG. 12 illustrates an example of partial data according to the first preferred embodiment of the present invention.

As illustrated in FIGS. 11 and 12, the data extractor 85 extracts, as partial data H13, the designated crop 2 (referred to as "designated crop 2*a*") and its surrounding area from the sensor data H11. In other words, the data extractor 85 extracts, from a sensed subject (captured image obtained from the sensor data H11 or an object imaged in the sensor data H11), a portion (partial image) H16 corresponding to the designated crop 2 (designated crop 2*a*) and its surrounding area.

Next, the estimator 86 estimates, for example, the type of the designated crop 2*a* based on the surface condition of the designated crop 2*a* obtained from the partial data H13 (partial image H16) extracted by the data extractor 85.

Specifically, as shown in FIG. 13, the estimator 86 uses a model (surface condition model), trained on types of crops 2 and surface conditions of the crops 2, to estimate the type of the designated crop 2*a* in the partial data H13. The surface condition model is a trained model built by inputting, into a computer, crop surface information in which surface conditions of many crops 2 and types of the crops 2 are associated with each other and causing the computer to perform deep learning using artificial intelligence (AI).

Figure 14A:
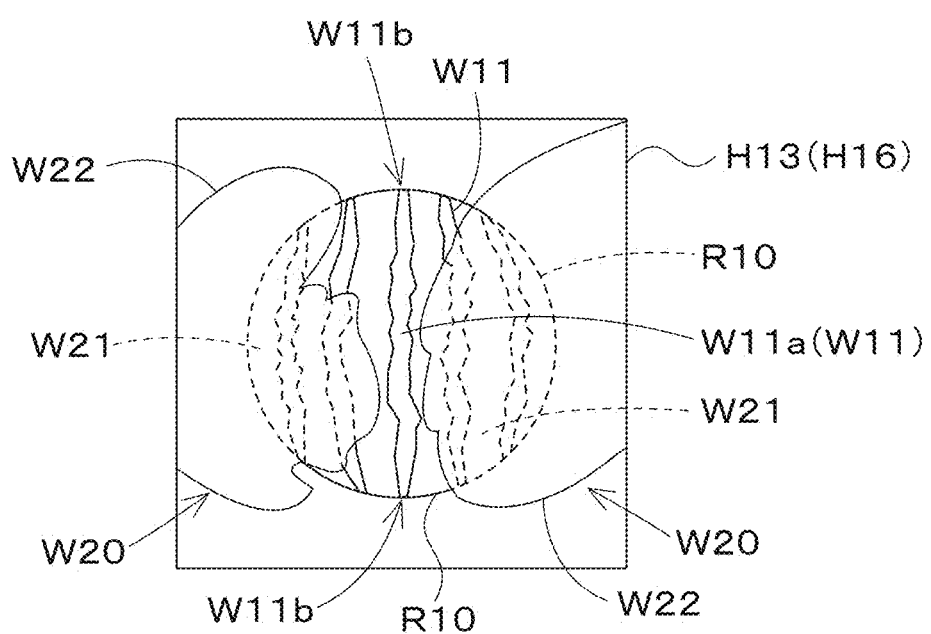
FIG. 14A illustrates a crop in partial image in which the outline of the crop is partially exposed, in the first preferred embodiment of the present invention.

The surface condition model estimates what type (of the crop 2) the designated crop 2*a* is, from the pattern on the designated crop 2*a* (which is a surface condition of the designated crop 2*a*) obtained from the partial data H13 (partial image H16). For example, as illustrated in FIGS. 14A to 14C, the surface condition model estimates the type of the designated crop 2*a* from a gap between lines W11 of the pattern, angles of the lines W11, how the lines W11 are connected, the shapes of the lines W11, and/or how the lines W11 are arranged on the surface of the designated crop 2*a*.

The estimator 86 calculates an outline R10 of the designated crop 2*a* included in the partial data H13 (partial image H16) based on the result of the estimation of the type of the designated crop 2*a*. For example, the estimator 86 refers to a basic shape (a round shape, a rectangular shape, or an oval shape) of the outline R10 and a reference diameter L10 of a crop 2, based on the result of the estimation of the designated crop 2*a* (for example, based on the type of the crop 2). As illustrated in FIG. 14A, the estimator 86 extracts, for example, a straight line (stripe) W11*a* from lines (stripes) W11 of the pattern on the designated crop 2*a* in the partial data H13 (partial image H16). It is noted here that, if the estimator 86 succeeds in obtaining opposite ends W11*b* of the line W11*a* from the partial data H13 (partial image H16), the estimator 86 estimates that a line forming a circle or an oval passing through the opposite ends W11*b* of the line W11*a* is the outline R10 of the designated crop 2.

Figure 14B:
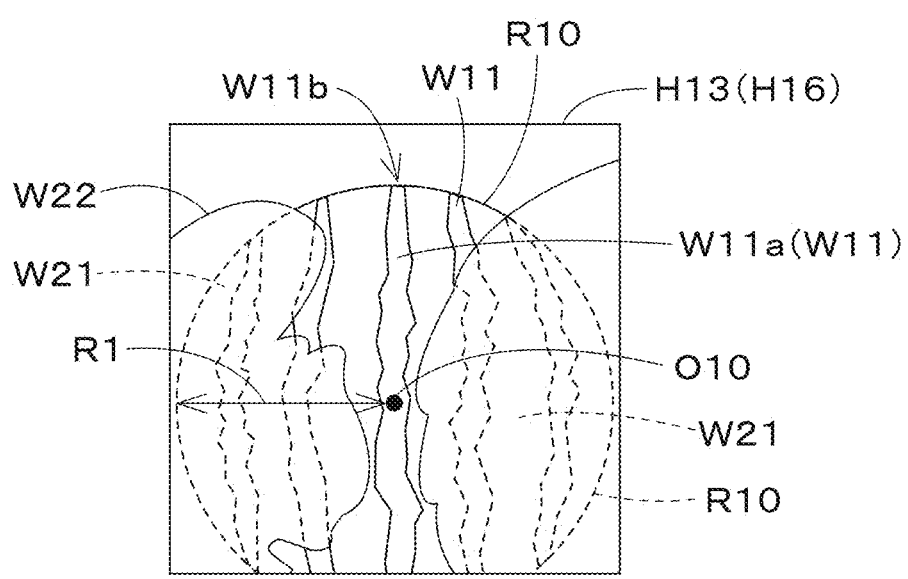
FIG. 14B, which differs from FIG. 14A, illustrates a crop in partial image in which the outline of the crop is partially exposed, in the first preferred embodiment of the present invention.

As illustrated in FIG. 14B, if the estimator 86 extracts one of the opposite ends W11*b* of the line W11*a*, the estimator 86 estimates that a point located at a distance corresponding to half the reference diameter from the one of the opposite ends W11*b* on the line W11*a* is a center O10 of the designated crop 2*a*, that a distance corresponding to half the reference diameter from the center O10 is a radius R1 of the designated crop 2*a*, and that a line forming a circle passing through the one of the opposite ends W11*b* and having the radius R1 is the outline R10 of the designated crop 2.

Figure 14C:
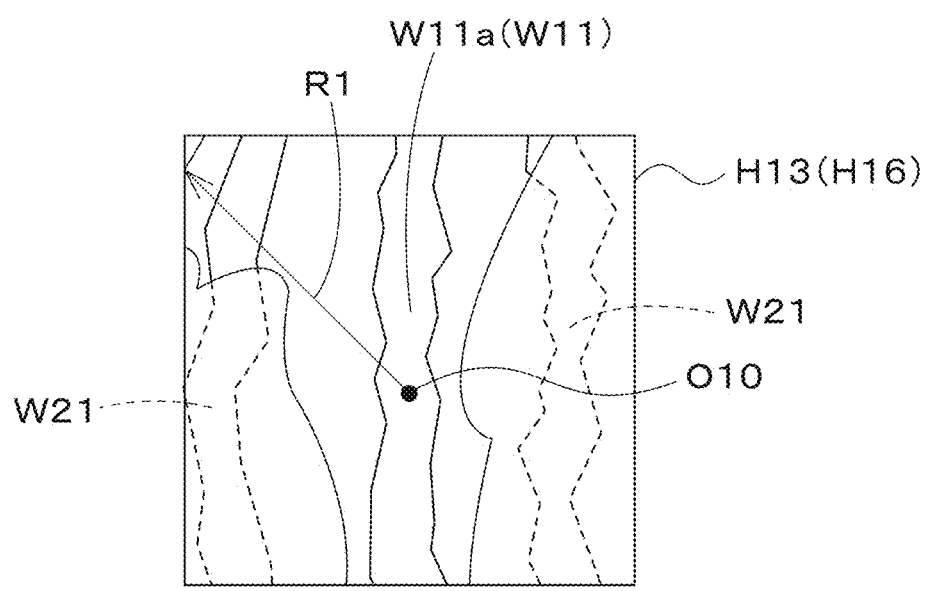
FIG. 14C illustrates partial image in which the outline of the crop is hidden, in the first preferred embodiment of the present invention.

As illustrated in FIG. 14C, if the ends W11*b* of the line W11*a* are on or outside the frame of an extracted image defined by the partial data H13 (partial image H16), the estimator 86 estimates the center O10 of the designated crop 2 from the pattern on the designated crop 2*a* in the frame of the extracted image, and estimates that a line forming a circle having the radius R1 is the outline R10 of the designated crop 2*a*.

Note that FIGS. 14A to 14C are examples, and the surface condition model may estimate not only the type of crop but also the size of the crop from the pattern on the crop 2 and/or the like.

As illustrated in FIGS. 14A to 14C, the estimator 86 may, with respect to a surrounding area of the crop 2 obtained in the partial data H13 (partial image H16), estimate an obstacle W20 which hides the surface of the crop 2 having been subjected to the estimation. As illustrated in FIGS. 14A to 14C, for example, the estimator 86 extracts, from the surface of the crop 2, a portion W21 other than portions having been determined by the surface condition model as being the pattern on the surface of the crop 2, determines that an overlap between the portion W21 and an area defined by the outline R10 of the designated crop 2 is a portion of the obstacle W20, and extracts an entire outline W22 of the obstacle W20 by image processing and/or the like.

Figure 15:
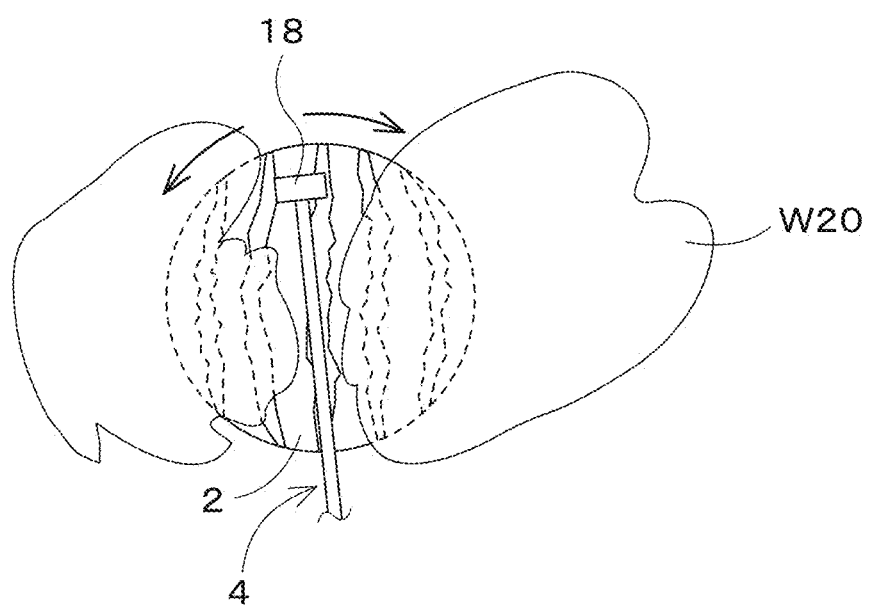
FIG. 15 illustrates how work to move an obstacle away from a crop is done, in the first preferred embodiment of the present invention.

If, as described above, the estimator 86 extracts the entire outline W22 of the obstacle W20, i.e., if the estimator 86 estimates the obstacle W20, the agricultural robot 1 does the work to move the obstacle W20 away from the crop 2 when, for example, harvesting the crop 2. As illustrated in FIG. 15, the work controller 41B, at the time of harvesting, controls the manipulator (working unit) 4 (robot hand 18) to bring the distal end of the robot hand 18 closer to the obstacle W20, bring a portion of the robot hand 18 into contact with the obstacle W20, and move the robot hand 18 with its distal portion in contact with the obstacle W20 to move the obstacle W20 away from the surface of the crop 2. That is, the robot hand 18 performs the action of moving the obstacle W20 away from the crop 2 when harvesting the crop 2.

In the above-described preferred embodiment, a case in which the agricultural robot 1 includes the trained model (surface condition model) is discussed. Note that, as illustrated in FIG. 8, the agricultural robot 1 may include a model generator 41J to generate the surface condition model. The model generator 41J includes electric/electronic circuit(s) provided in the controller 41, program(s) stored in the controller 41, and/or the like.

First, when the agricultural robot 1 harvests a crop 2, the controller 41 acquires sensor data (data of the surface of the crop 2) obtained by sensing the surface of the crop 2 with the optical sensor 5A and/or the optical sensor 5B. The controller 41 acquires data of the surface of each crop 2 when harvesting it, and stores the acquired data in the form of a database. The model generator 41J builds a surface condition model by subjecting data of the surfaces of many crops 2 acquired by the controller 41 to deep learning. Note that the model generator 41J acquires, from the controller 41, data of the surface of each crop 2 when harvesting it even after the surface condition model is built, to continue reinforcement learning.

An agricultural robot 1 includes a traveling body 3, a working unit 4 on the traveling body 3 to do work relating to a crop 2, an optical sensor 5A, 5B on the traveling body 3, and a crop estimator 411 to perform estimation of the crop 2 based on sensor data obtained by the optical sensor 5A, 5B, and the crop estimator 411 includes a data extractor 85 to designate the crop 2 to be subjected to the estimation based on the sensor data and extract, as partial data H13, a portion of the sensor data that corresponds to the designated crop 2, and an estimator 86 to perform the estimation of the crop 2 based on a surface condition of the crop 2 obtained from the partial data H13 extracted by the data extractor 85. With this, a crop 2 is designated from sensor data, data corresponding to the designated crop 2 is extracted as partial data H13, and then the estimation of the crop 2 is performed based on the surface condition in the extracted partial data H13, making it possible to perform the estimation of the crop 2 more efficiently and accurately. That is, it is possible to easily estimate a crop from sensor data.

The estimator 86 may be operable to, with respect to the crop 2 represented in the partial data H13, perform the estimation of the crop 2 based on a type of the crop 2 and the surface condition of the crop 2. The surface condition differs depending on the type of crop 2 and therefore, with the above configuration, since the estimation of the crop 2 is performed using type(s) of crop(s) 2 and surface condition(s), it is possible to estimate the crop 2 more accurately. In particular, even in cases where the surface of the crop 2 is covered and hidden by an obstacle W20 and only a portion of the surface condition of the crop 2 is exposed, it is still possible to easily estimate what the crop 2 is based on the relationship(s) between the type(s) of crop(s) 2 and surface condition(s).

The estimator 86 may be operable to perform the estimation of the crop 2 based on the type of the crop 2 and a pattern on the crop 2 as the surface condition of the crop 2. This makes it possible to easily estimate the crop 2 based on the fact that the pattern differs depending on the type of crop 2.

The estimator 86 may be operable to calculate, based on a result of the estimation of the crop 2, an outline W22 of the crop 2 included in the partial data H13. With this, for example, in the case where the result of the estimation of the crop 2 is the type of the crop 2, it is possible to easily determine the outline W22 of the crop 2 based on the size corresponding to the type of the crop 2 and on the partial data H13.

The estimator 86 may be operable to perform estimation of a type of the crop 2 and, with respect to a surrounding area of the crop 2 obtained in the partial data H13, estimate an obstacle W20 which hides a surface of the crop 2 having been subjected to the estimation. This makes it possible to easily estimate the outline of the obstacle W20, and possible to know the size of the obstacle W20 which covers the surface of the crop 2.

The working unit 4 may be operable to do work to move the obstacle W20 estimated by the estimator 86 away from the crop 2. This makes it possible, when work is done with respect to the crop 2 by the agricultural robot 1, to move the obstacle W20 which hinders the work away from the crop 2, making it possible to do the work efficiently. For example, in the case where the work is harvesting, it is possible to perform harvesting with the working unit 4 after removing the obstacle W20. Also in the case where the work is tapping the crop 2, acquiring a sound produced by tapping, and/or the like work, it is possible to do the work such as tapping the crop 2 after removing the obstacle W20.

The agricultural robot 1 may further include a model generator 41J to generate a surface condition model by subjecting a relationship between the crop 2 and the surface condition of the crop 2 to deep learning. This makes it possible to easily prepare a model to estimate the relationship between a crop 2 and the surface condition of the crop 2.

Second Preferred Embodiment

The following description discusses a second preferred embodiment of the present invention with reference to drawings. The same elements as those discussed in the first preferred embodiment are assigned identical reference signs and specific descriptions therefor are omitted.

Figure 20A:
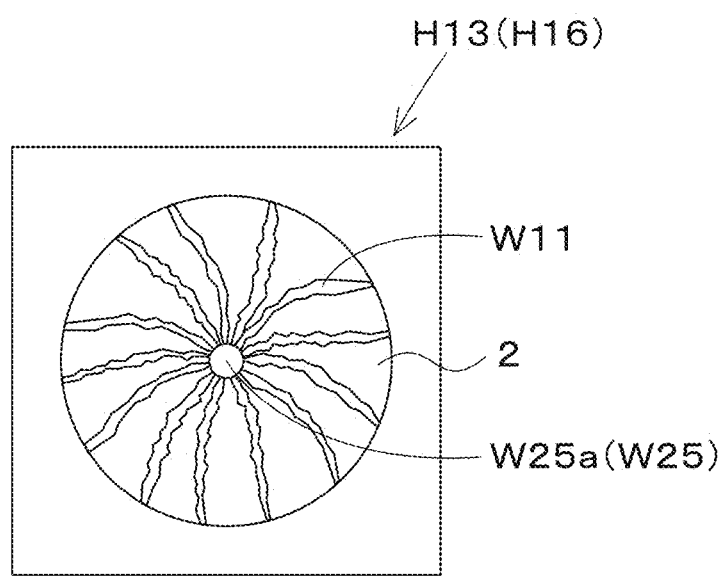
FIG. 20A is an illustration in which a stem end is extracted as a feature according to a second preferred embodiment of the present invention.
Figure 20B:
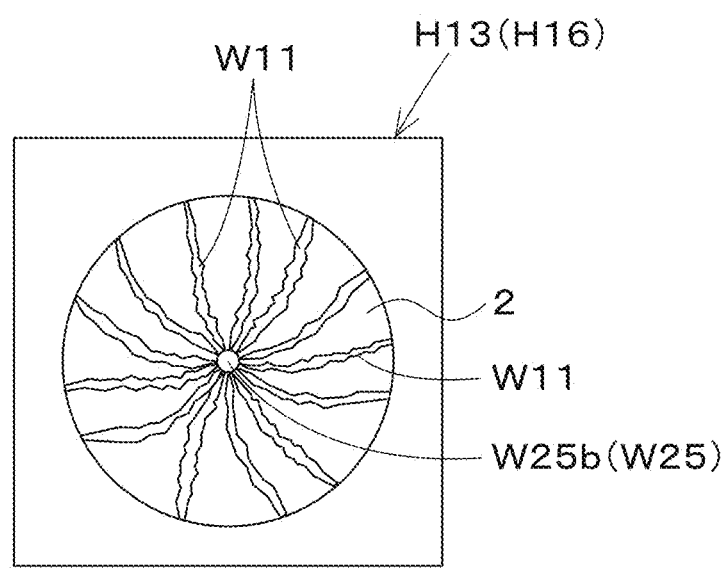
FIG. 20B is an illustration in which a navel is extracted as a feature according to the second preferred embodiment of the present invention.
Figure 20C:
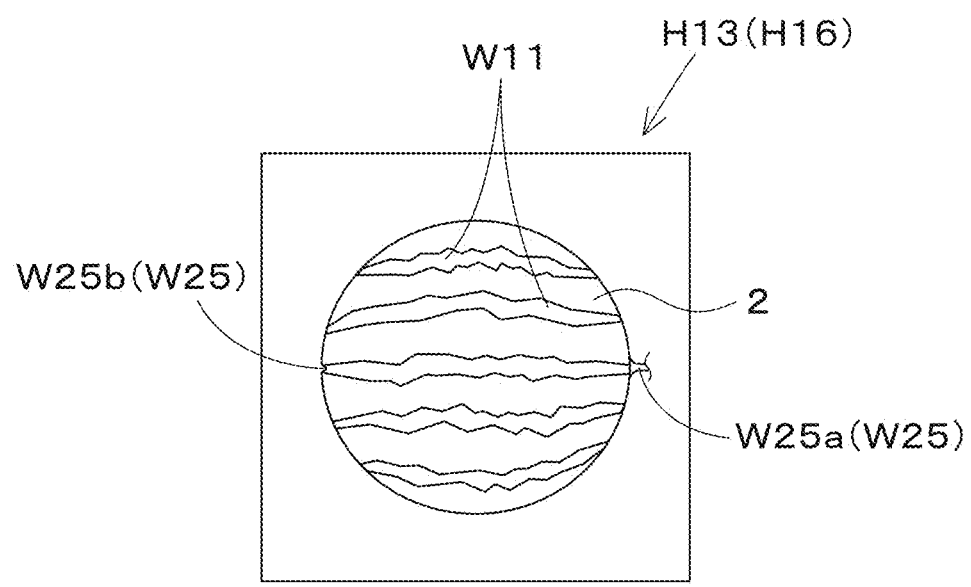
FIG. 20C is an illustration in which a stem end and a navel are extracted as features according to the second preferred embodiment of the present invention.

Referring to FIG. 8, a controller 41 according to the second preferred embodiment is such that the estimator 86 refers to partial data H13 (partial image H16) of a crop 2 identified by a surface condition model and, as illustrated in FIGS. 20A to 20C, estimates the posture of the crop 2 based on feature(s) W25 of the crop 2 and the surface condition (line(s) W11 of the pattern) of the crop 2. For example, as illustrated in FIGS. 20A, 20B, and 20C, the estimator 86 extracts, from the partial image H16, portion(s) corresponding to a stem end W25a and/or a navel W25b of the crop 2 as feature(s) W25.

Figure 21A:
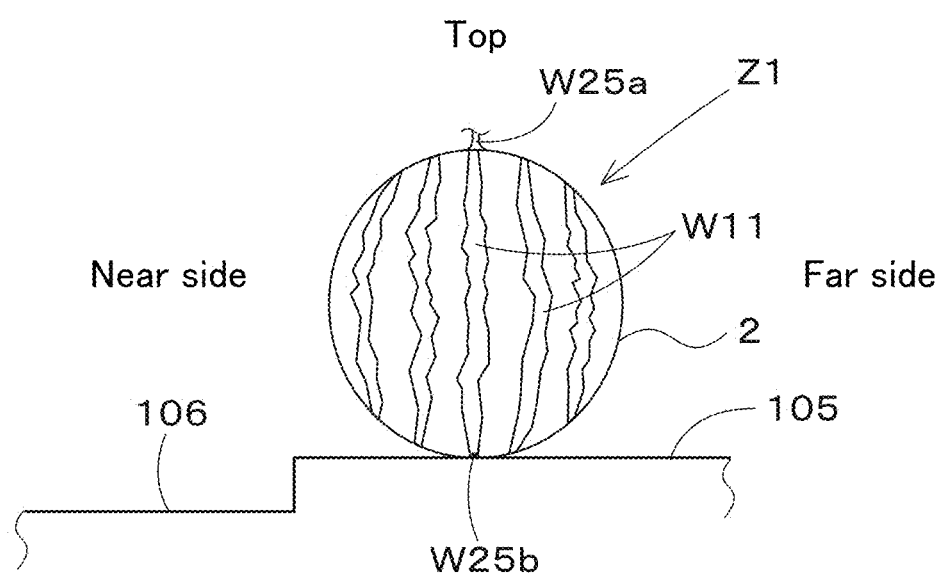
FIG. 21A illustrates a first posture of a crop according to the second preferred embodiment of the present invention.

If, for example, the image of the crop 2 is captured from above, the stem end W25a is extracted as a feature W25, and ends of a respective plurality of lines W11 are adjacent to the stem end W25a as illustrated in FIG. 20A, the estimator 86 estimates the crop 2 as being in a posture Z1 (first posture) in which the navel W25b is located on the same side of the crop 2 as the ground of a cultivation area 105 and the stem end W25a faces up as illustrated in FIG. 21A.

Figure 21B:
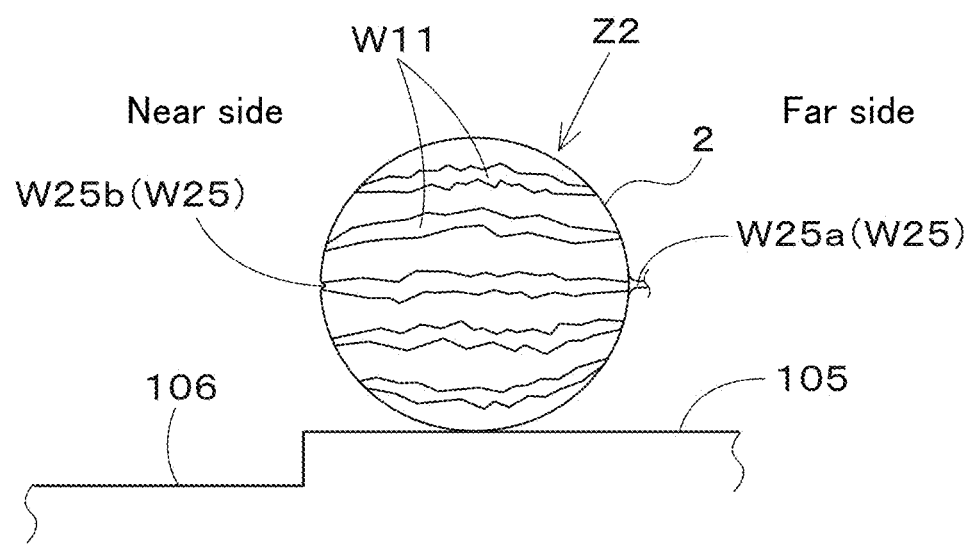
FIG. 21B illustrates a second posture of the crop according to the second preferred embodiment of the present invention.

If, for example, the image of the crop 2 is captured from the near side (from a passage 106), the navel W25b is extracted as a feature W25, and ends of a respective plurality of lines W11 are adjacent to the navel W25b as illustrated in FIG. 20B, the estimator 86 estimates the crop 2 as being in a posture Z2 (second posture) in which the navel W25b faces toward the agricultural robot 1 and the stem end W25a faces in a direction away from the agricultural robot 1 as illustrated in FIG. 21B. That is, the crop 2 is in a second posture Z2 in which the crop 2 is laid such that the stem end W25a faces away from the agricultural robot 1.

Figure 21C:
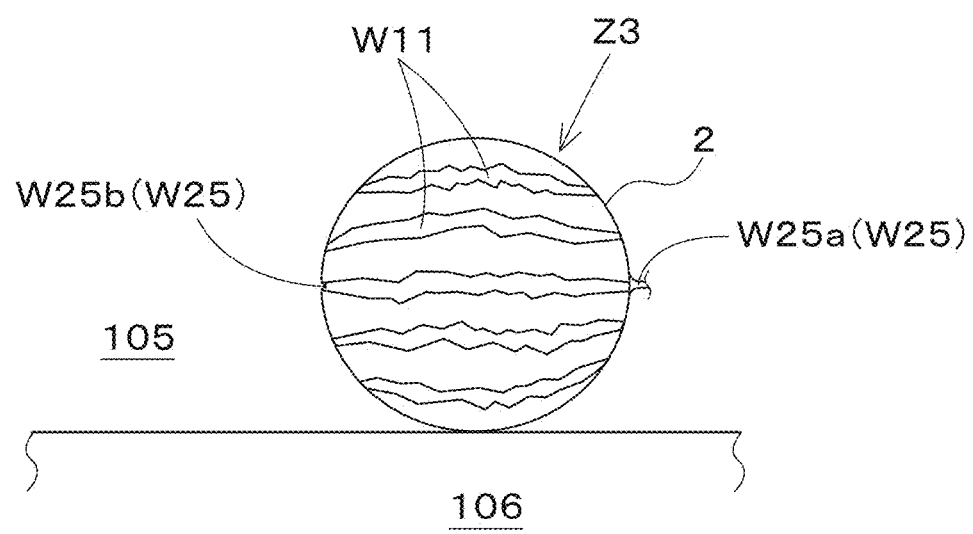
FIG. 21C illustrates a third posture of the crop according to the second preferred embodiment of the present invention.

If, for example, the image of the crop 2 is captured from the near side (from a passage 106), the stem end W25a and the navel W25b are extracted as features W25, and at least one line W11 extends toward the stem end W25a and toward the navel W25b as illustrated in FIG. 20C, the estimator 86 estimates the crop 2 as being in a posture Z3 (third posture) in which the crop 2 is positioned along the agricultural robot 1 as illustrated in FIG. 21C. That is, the crop 2 is in a third posture Z3 in which, assuming that the stem end W25a is at the top of the crop 2, the crop 2 is laid in a direction parallel to the agricultural robot 1.

Figure 22A:
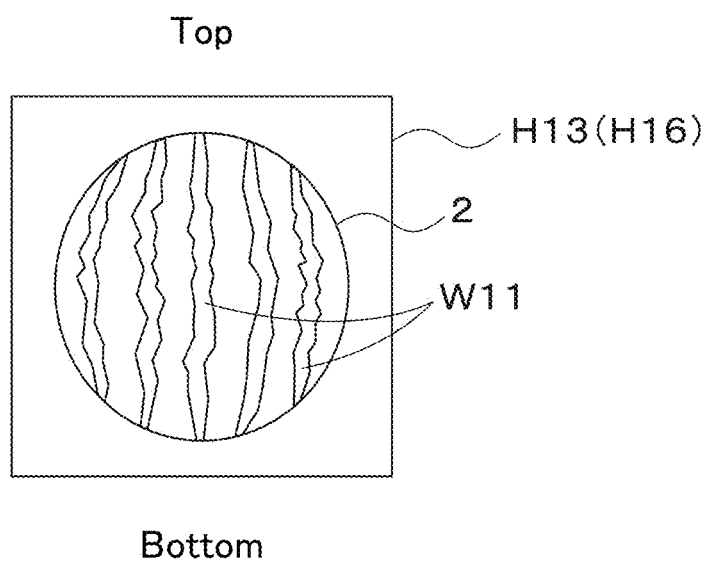
FIG. 22A is an illustration in which lines of a pattern on a crop extend in an up-and-down direction (vertical direction) in the second preferred embodiment of the present invention.
Figure 22B:
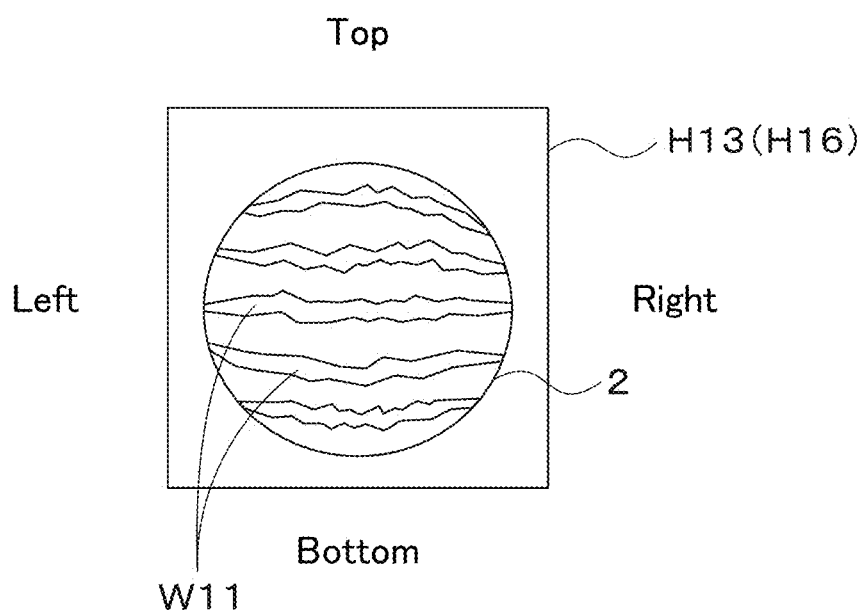
FIG. 22B is an illustration in which the lines of the pattern on the crop extend in a sideways direction (horizontal direction) in the second preferred embodiment of the present invention.

Note that the crop estimator 411 (estimator 86) may estimate the posture based on the orientation of the pattern on the surface of the crop 2. If the direction of extension of line(s) W11 (longitudinal direction of continuous line(s)) of the pattern on the surface is an up-and-down direction (vertical direction) in the partial image H16 as illustrated in FIG. 22A, the crop estimator 411 (estimator 86) estimates the crop 2 as being in the first posture Z1. If the direction of extension of line(s) W11 is a sideways direction (horizontal direction) in the partial image H16 as illustrated in FIG. 22B, the crop estimator 411 (estimator 86) estimates the crop 2 as being in the third posture Z3.

Figure 23A:
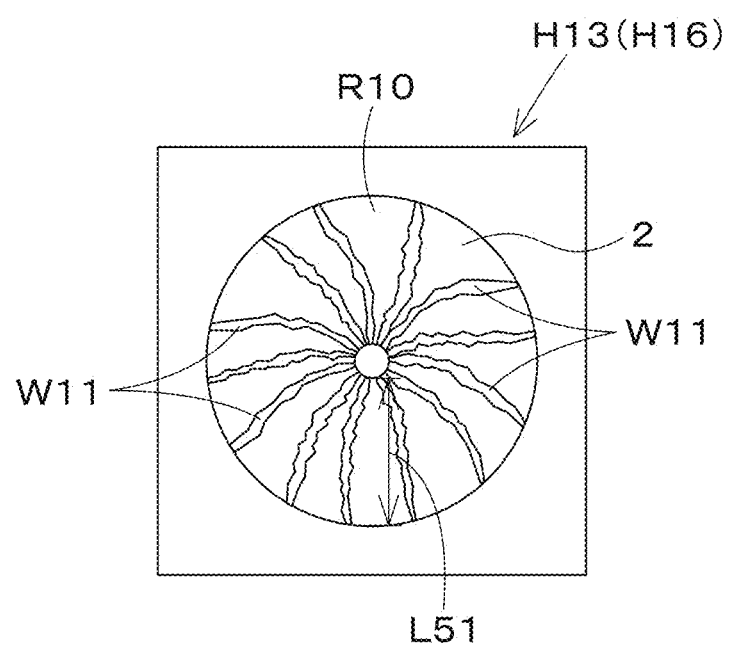
FIG. 23A is an illustration in which the pattern on the crop has a length equal to or shorter than a standard length in the second preferred embodiment of the present invention.

The crop estimator 411 (estimator 86) may estimate the posture based on the lengths of the lines W11 of the pattern on the surface of a crop. If lengths L51 of lines W11 are substantially the same (within a predetermined range) and equal to or less than the standard length of a line on a crop 2 (equal to or less than a reference) in the partial image H16 as illustrated in FIG. 23A, the crop estimator 411 (estimator 86) estimates the crop as being in the first posture Z1 or the second posture Z2. It is noted here that the crop estimator 411 (estimator 86) estimates the crop 2 as being in the first posture Z1 when the image of the crop 2 captured by the optical sensor 5A or 5B from above is as illustrated in FIG. 23A, and estimates the crop 2 as being in the second posture Z2 when the image of the crop 2 captured by the optical sensor 5A or 5B from the side (from a passage 106) is as illustrated in FIG. 23A.

Figure 23B:
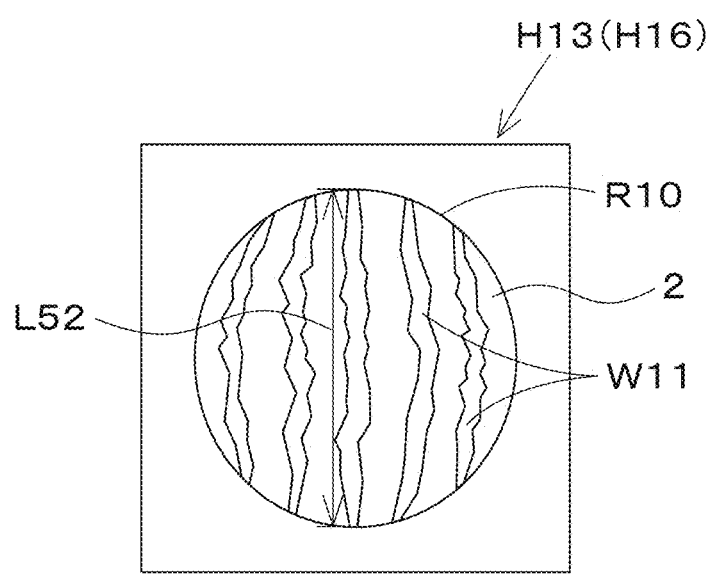
FIG. 23B is an illustration in which the pattern on the crop has a length longer than the standard length in the second preferred embodiment of the present invention.

If a length L52 of the longest one of a plurality of lines W11 is greater than the standard length of a line on the crop 2 (greater than a reference) in the partial image H16 as illustrated in FIG. 23B, the crop estimator 411 (estimator 86) estimates the crop 2 as being in the second posture Z2 or the third posture Z3. It is noted here that the crop estimator 411 (estimator 86) estimates the crop 2 as being in the second posture Z2 when the image of the crop 2 captured by the optical sensor 5A or 5B from above is as illustrated in FIG. 23B, and estimates the crop 2 as being in the third posture Z3 when the image of the crop 2 captured by the optical sensor 5A or 5B from the side (from a passage 106) is as illustrated in FIG. 23B.

The crop estimator 411 (estimator 86) may estimate the posture based on positional relationship(s) between feature(s) W25 of the crop 2 and the pattern on the crop 2.

Figure 24A:
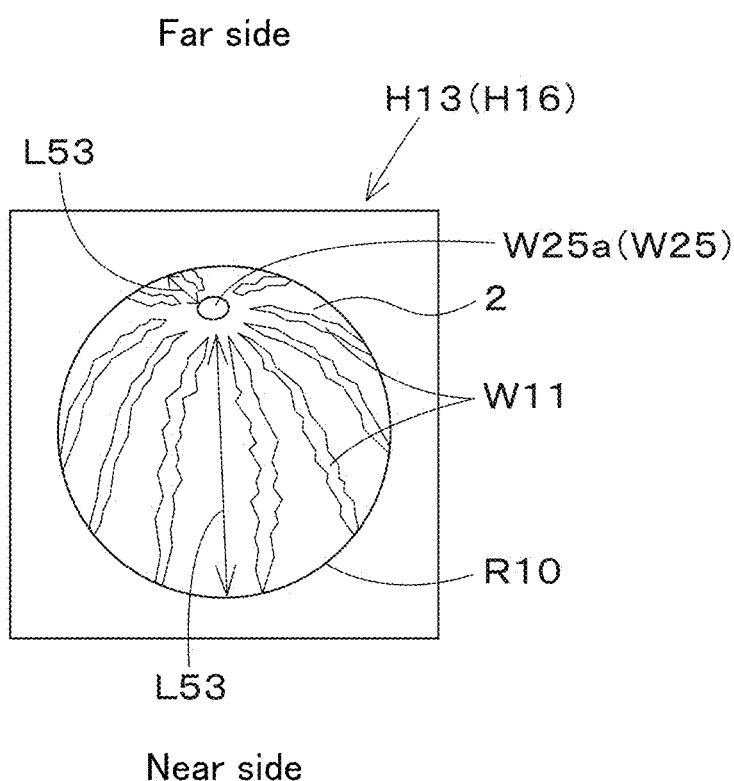
FIG. 24A illustrates a case in which lines on the near side of the stem end of a crop are longer than those on the far side of the stem end in the second preferred embodiment of the present invention.
Figure 24B:
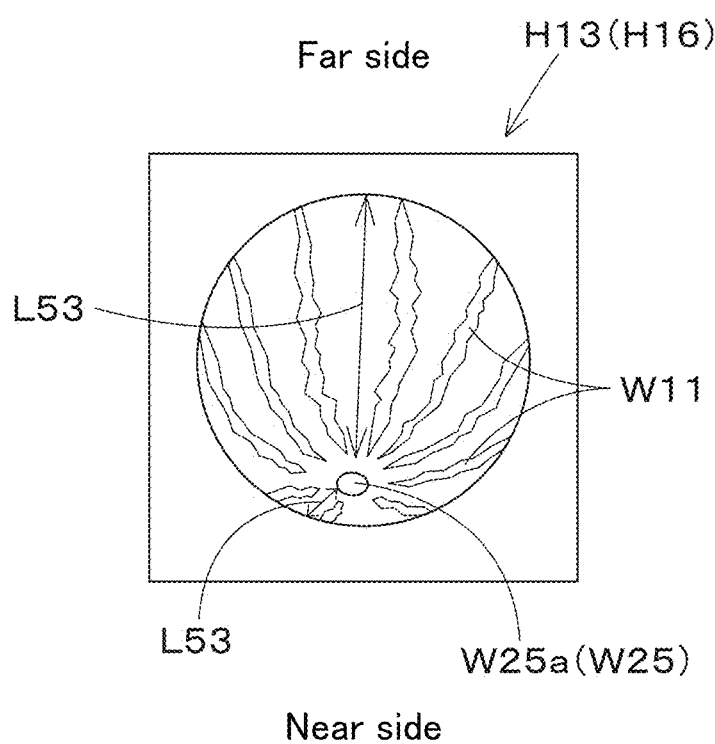
FIG. 24B illustrates a case in which lines on the near side of the stem end of the crop are shorter than those on the far side of the stem end in the second preferred embodiment of the present invention.

If lengths L53 of a plurality of lines W11 are longer on the near side of the stem end W25a than on the far side of the stem end W25a in the partial image H16 as illustrated in FIG. 24A, the crop estimator 411 (estimator 86) estimates the crop 2 as being in the first posture Z1 but being slightly tilted to the far side. If the lengths L53 of the plurality of lines W11 are shorter on the near side of the stem end W25a than on the far side of the stem end W25a in the partial image H16 as illustrated in FIG. 24B, the crop estimator 411 (estimator 86) estimates the crop 2 as being in the first posture Z1 but being slightly tilted to the near side.

The estimator 86 calculates an outline R10 of the designated crop 2a included in the partial data H13 (partial image H16) based on the result of the estimation of the type of the designated crop 2a. For example, the estimator 86 refers to a basic shape (a round shape, a rectangular shape, or an oval shape) of the outline R10 and a reference diameter L10 of a crop 2, based on the result of the estimation of the designated crop 2a (for example, based on the type of the crop 2). As illustrated in FIG. 14A, the estimator 86 extracts, for example, a straight line (stripe) W11a from lines (stripes) W11 of the pattern on the designated crop 2a in the partial data H13 (partial image H16). It is noted here that, if the estimator 86 succeeds in obtaining opposite ends W11b of the line W11a from the partial data H13 (partial image H16), the estimator 86 estimates that a line forming a circle or an oval passing through the opposite ends W11b of the line W11a is the outline R10 of the designated crop 2.

As illustrated in FIG. 14B, if the estimator 86 extracts one of the opposite ends W11b of the line W11a, the estimator 86 estimates that a point located at a distance corresponding to half the reference diameter from the one of the opposite ends W11b on the line W11a is a center O10 of the designated crop 2a, that a distance corresponding to half the reference diameter from the center O10 is a radius R1 of the designated crop 2a, and that a line forming a circle passing through the one of the opposite ends W11b and having the radius R1 is the outline R10 of the designated crop 2.

As illustrated in FIG. 14C, if the ends W11b of the line W11a are on or outside the frame of an extracted image defined by the partial data H13 (partial image H16), the estimator 86 estimates the center O10 of the designated crop 2 from the pattern on the designated crop 2a in the frame of the extracted image, and estimates that a line forming a circle having the radius R1 is the outline R10 of the designated crop 2a.

Note that FIGS. 14A to 14C are examples, and the surface condition model may estimate not only the posture of a crop but also the size of the crop from the pattern on the crop 2 and/or the like.

As illustrated in FIGS. 14A to 14C, the estimator 86 may, with respect to a surrounding area of the crop 2 obtained in the partial data H13 (partial image H16), estimate an obstacle W20 which hides the surface of the crop 2 having been subjected to the estimation. As illustrated in FIGS. 14A to 14C, for example, the estimator 86 extracts, from the surface of the crop 2, a portion W21 other than portions having been determined by the surface condition model as being the pattern on the surface of the crop 2, determines that an overlap between the portion W21 and an area defined by the outline R10 of the designated crop 2 is a portion of the obstacle W20, and extracts an entire outline W22 of the obstacle W20 by image processing and/or the like.

If, as described above, the estimator 86 extracts the entire outline W22 of the obstacle W20, i.e., if the estimator 86 estimates the obstacle W20, the agricultural robot 1 does the work to move the obstacle W20 away from the crop 2 when, for example, harvesting the crop 2. As illustrated in FIG. 15, the work controller 41B, at the time of harvesting, controls the manipulator (working unit) 4 (robot hand 18) to bring the distal end of the robot hand 18 closer to the obstacle W20, bring a portion of the robot hand 18 into contact with the obstacle W20, and move the robot hand 18 with its distal portion in contact with the obstacle W20 to move the obstacle W20 away from the surface of the crop 2. That is, the robot hand 18 performs the action of moving the obstacle W20 away from the crop 2 when harvesting the crop 2.

In the above-described preferred embodiment, a case in which the agricultural robot 1 includes the trained model (surface condition model) is discussed. Note that the agricultural robot 1 may include a model generator 41J to generate the surface condition model. The model generator 41J is electric/electronic circuit(s) provided in the controller 41, program(s) stored in the controller 41, and/or the like.

First, when the agricultural robot 1 harvests a crop 2, the controller 41 acquires sensor data (data of the surface of the crop 2) obtained by sensing the surface of the crop 2 with the optical sensor 5A and/or the optical sensor 5B. The controller 41 acquires data of the surface of each crop 2 when harvesting it, and stores the acquired data in the form of a database. The model generator 41J builds a surface condition model by subjecting data of the surfaces of many crops 2 acquired by the controller 41 to deep learning. Note that the model generator 41J acquires, from the controller 41, data of the surface of each crop 2 when harvesting it even after the surface condition model is built, to continue reinforcement learning.

An agricultural robot 1 includes a traveling body 3, a working unit on the traveling body 3 to do work relating to a crop 2, an optical sensor 5A, 5B on the traveling body 3, and a crop estimator 41I to perform estimation of the crop 2 based on sensor data obtained by the optical sensor 5A, 5B, and the crop estimator 41I is operable to perform estimation of a posture of the crop 2 based on a surface condition of the crop 2 obtained from the sensor data. This makes it possible to easily know in what posture the crop 2 under cultivation is in. It is noted here that the orientation of the manipulator (working unit) 4 relative to the crop 2 can be changed depending on the posture of the crop 2, making it possible to improve workability.

The crop estimator 41I may be operable to, with respect to the crop 2 represented in the sensor data, perform the estimation of the posture of the crop 2 based on one or more features of the crop 2 and the surface condition of the crop 2. This makes it possible to estimate the posture of the crop 2 based on the relationship between the feature(s) and the surface condition of the crop 2. For example, assuming that the stem end W25a and the navel W25b of the crop 2 are features, it is possible to know the posture of the crop 2 (for example, the crop 2 is pointing upward or titled sideways) based on the relationship between the directions in which the stem end W25a and the navel W25b are pointing and the shape(s) on the surface of the crop 2.

The crop estimator 41I may be operable to perform the estimation of the posture based on an orientation of a pattern on a surface of the crop 2 represented in the sensor data. This makes it possible to easily know the posture of the crop 2 based on, for example, whether the pattern on the surface of the crop 2 is oriented upward or downward.

The crop estimator 41I may be operable to perform the estimation of the posture based on a length of a pattern on a surface of the crop 2 represented in the sensor data. This makes it possible to easily know the posture of the crop 2 based on the length(s) of a particular pattern on the surface obtained by sensing the crop 2.

The crop estimator 41I may be operable to perform the estimation of the posture based on a positional relationship between one or more features of the crop 2 and a pattern. This makes it possible, for example, assuming that the stem end W25a and the navel W25b of the crop 2 are features, to easily know the posture of the crop 2 based on the positions of the stem end W25a, the navel W25b, and the pattern.

The crop estimator 41I may be operable to, based on the sensor data, perform estimation of an outline of the crop 2 and, with respect to a surrounding area of the crop 2, estimate an obstacle W20 which hides a surface of the crop 2 having been subjected to the estimation. This makes it possible to easily estimate the outline of the obstacle W20, and possible to know the size of the obstacle W20 which covers the surface of the crop 2.

The working unit 4 may be operable to do work to move the obstacle W20 estimated by the crop estimator 41I away from the crop 2. This makes it possible, when work is done with respect to the crop 2 by the agricultural robot 1, to move the obstacle W20 which hinders the work away from the crop 2, making it possible to do the work efficiently. For example, in the case where the work is harvesting, it is possible to perform harvesting with the working unit 4 after removing the obstacle W20. Also in the case where the work is tapping the crop 2, acquiring a sound produced by tapping, and/or the like work, it is possible to the work such as tapping the crop 2 after removing the obstacle W20.

The agricultural robot further includes a model generator 41J to generate a surface condition model by subjecting a relationship between the crop 2 and the surface condition of the crop 2 to deep learning. This makes it possible to easily prepare a model to estimate the relationship between a crop 2 and the surface condition of the crop 2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural robot comprising:
a traveling body;
a working actuator on the traveling body to do work relating to a crop;
an optical sensor on the traveling body; and
a controller configured or programmed to perform estimation of the crop based on sensor data obtained by the optical sensor, and control the traveling body and/or the working actuator based on a result of the estimation of the crop; wherein the controller is configured or programmed to:
designate the crop to be subjected to the estimation based on the sensor data and extract, as partial data, a portion of the sensor data that corresponds to the designated crop;
perform the estimation of the crop based on a surface condition of the crop obtained from the extracted partial data; and
when the surface condition of the crop obtained from the extracted partial data includes a surface pattern of the crop including one or more lines, perform estimation of at least a type of the crop based on the one or more lines of the surface pattern on the crop.

2. The agricultural robot according to claim 1, wherein the controller is configured or programmed to, when the surface condition of the crop obtained from the extracted partial data includes the surface pattern of the crop including one or more lines, perform the estimation of at least the type of the crop based on at least one of a gap between the lines, an angle or angles of the one or more lines, how the lines are connected, a shape or shapes of the one or more lines and/or how the lines are arranged.

3. The agricultural robot according to claim 1, wherein the controller is configured or programmed to calculate, based on a result of the estimation of the crop, an outline of the crop included in the partial data.

4. The agricultural robot according to claim 1, wherein the controller is configured or programmed to, with respect to a surrounding area of the crop obtained in the partial data, estimate an obstacle which hides a surface of the crop having been subjected to the estimation.

5. The agricultural robot according to claim 4, wherein the controller is configured or programmed to control the working actuator to perform work to move the estimated obstacle away from the crop.

6. The agricultural robot according to claim 1, wherein the controller is configured or programmed to generate a surface condition model by subjecting a relationship between the crop and the surface condition of the crop to deep learning.

7. An agricultural robot comprising:
a traveling body;
a working actuator on the traveling body to do work relating to a crop;
an optical sensor on the traveling body; and
a controller configured or programmed to perform estimation of the crop based on sensor data obtained by the optical sensor, and control the traveling body and/or the working actuator based on a result of the estimation of the crop; wherein
the controller is configured or programmed to, when a surface condition of the crop obtained from the sensor data includes a surface pattern of the crop including one or more lines, perform estimation of a posture of the crop based on the one or more lines of the surface pattern in the surface condition of the crop obtained from the sensor data.

8. The agricultural robot according to claim 7, wherein the controller is configured or programmed to, with respect to the crop represented in the sensor data, perform the estimation of the posture of the crop based on one or more features of the crop and the one or more lines of the surface pattern of the crop.

9. The agricultural robot according to claim 7, wherein the controller is configured or programmed to perform the estimation of the posture based on an orientation or orientations of the one or more lines of the surface pattern of the crop represented in the sensor data.

10. The agricultural robot according to claim 7, wherein the controller is configured or programmed to perform the estimation of the posture based on a length or lengths of the one or more lines of the surface pattern of the crop represented in the sensor data.

11. The agricultural robot according to claim 7, wherein the controller is configured or programmed to perform the estimation of the posture based on a positional relationship between one or more features of the crop and the one or more lines of the surface pattern of the crop.

12. The agricultural robot according to claim 7, wherein the controller is configured or programmed to, based on the sensor data, perform estimation of an outline of the crop and, with respect to a surrounding area of the crop, estimate an obstacle which hides a surface of the crop having been subjected to the estimation.

13. The agricultural robot according to claim 12, wherein the controller is configured or programmed to control the working actuator to perform work to move the estimated obstacle away from the crop.

14. The agricultural robot according to claim 7, wherein the controller is configured or programmed to generate a surface condition model by subjecting a relationship between the crop and the surface condition of the crop to deep learning.

* * * * *